(12) United States Patent
Files et al.

(10) Patent No.: US 12,108,147 B2
(45) Date of Patent: Oct. 1, 2024

(54) CAMERA WITH MICROPHONE MUTE RESPONSIVE TO MOVEMENT

(71) Applicant: Dell Products L.P., Round Rock, TX (US)

(72) Inventors: Jace W. Files, Round Rock, TX (US); John Trevor Morrison, Round Rock, TX (US); Andrew T. Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 126 days.

(21) Appl. No.: 17/577,979

(22) Filed: Jan. 18, 2022

(65) Prior Publication Data
US 2023/0188839 A1 Jun. 15, 2023

Related U.S. Application Data

(63) Continuation-in-part of application No. 17/550,748, filed on Dec. 14, 2021.

(51) Int. Cl.
*H04N 23/667* (2023.01)
*H04N 23/68* (2023.01)
*H04R 3/04* (2006.01)

(52) U.S. Cl.
CPC ....... *H04N 23/667* (2023.01); *H04N 23/6812* (2023.01); *H04R 3/04* (2013.01); *H04R 2430/01* (2013.01)

(58) Field of Classification Search
CPC ............ H04N 5/2253; H04N 5/23206; H04N 5/23245; H04N 5/23258; H05K 5/00–069; H04R 3/04; H04R 2430/01

USPC ...................................................... 348/14.16
See application file for complete search history.

(56) References Cited

U.S. PATENT DOCUMENTS

| | | | |
|---|---|---|---|
| 7,127,163 B2 | 10/2006 | Lee et al. |
| 7,728,963 B2 | 6/2010 | Kirschner |
| 7,830,628 B2 | 11/2010 | Schaefer |
| 8,169,185 B2 | 5/2012 | Partovi et al. |
| 8,541,975 B2 | 9/2013 | Park et al. |
| 8,564,544 B2 | 10/2013 | Jobs et al. |
| 8,639,106 B1 | 1/2014 | Gleason et al. |
| 9,398,258 B1 | 7/2016 | Sandvik et al. |
| 9,628,688 B2 | 4/2017 | Martin et al. |

(Continued)

FOREIGN PATENT DOCUMENTS

| | | |
|---|---|---|
| EP | 3846142 A1 | 7/2021 |
| KR | 200374132 Y1 * | 11/2004 |
| WO | 2019231642 A1 | 12/2019 |

*Primary Examiner* — Xi Wang
(74) *Attorney, Agent, or Firm* — ZAGORIN CAVE LLP; Robert W. Holland

(57) ABSTRACT

A camera integrates a magnet at one end of a housing to magnetically attract and attach the camera to a front side of a peripheral display, such as to support a video conference through an information handling system interfaced with the display. Camera position movement at a display panel front face is detected, such as with a touchscreen of the display panel, and accelerometer or an infrared curtain presented from the camera dock along the display panel front face. Audio and visual information communicated from the camera is altered when movement is detected at the camera, such as muting a microphone of the camera and cutting off capture of visual images by the camera module.

19 Claims, 22 Drawing Sheets

(56) References Cited

U.S. PATENT DOCUMENTS

| | | |
|---|---|---|
| 9,813,599 B1 | 11/2017 | Wang et al. |
| 10,266,125 B2 | 4/2019 | Wang |
| 10,491,806 B2 | 11/2019 | Lai et al. |
| 10,951,863 B2 | 3/2021 | Marutani et al. |
| 11,323,686 B2 | 5/2022 | Sheridan |
| 11,394,922 B2 | 7/2022 | Ahn |
| 2003/0058363 A1 | 3/2003 | Boyden et al. |
| 2004/0090533 A1 | 5/2004 | Dow et al. |
| 2008/0309786 A1* | 12/2008 | Archibald .............. H04N 5/772 348/222.1 |
| 2011/0193935 A1 | 8/2011 | Gorzynski |
| 2011/0260681 A1 | 10/2011 | Guccione et al. |
| 2012/0146902 A1 | 6/2012 | Adermann et al. |
| 2012/0174382 A1 | 7/2012 | Dering |
| 2012/0256715 A1 | 10/2012 | Fullerton |
| 2014/0028243 A1 | 1/2014 | Rayner |
| 2014/0218602 A1 | 8/2014 | Kim et al. |
| 2015/0036047 A1 | 2/2015 | Bledsoe |
| 2015/0153831 A1 | 6/2015 | Kim et al. |
| 2017/0063141 A1 | 3/2017 | Kim et al. |
| 2017/0099534 A1* | 4/2017 | Starobin ................ H04R 1/026 |
| 2017/0205987 A1 | 7/2017 | Martin et al. |
| 2018/0012376 A1 | 1/2018 | Dayal et al. |
| 2018/0189568 A1* | 7/2018 | Powderly .............. G06V 20/20 |
| 2018/0295328 A1 | 10/2018 | Tucker et al. |
| 2019/0230259 A1 | 7/2019 | Germe et al. |
| 2019/0260863 A1 | 8/2019 | Kinouchi |
| 2019/0373214 A1* | 12/2019 | Gurr ...................... H04N 23/62 |
| 2020/0227954 A1 | 7/2020 | Ding et al. |
| 2020/0288045 A1 | 9/2020 | Jeong et al. |
| 2020/0314299 A1 | 10/2020 | Okuley |
| 2020/0329177 A1 | 10/2020 | Greaves et al. |
| 2021/0026466 A1* | 1/2021 | Andersson .............. G06F 3/041 |
| 2021/0075967 A1 | 3/2021 | Yukitake et al. |
| 2021/0099030 A1 | 4/2021 | Walton et al. |
| 2022/0006889 A1 | 1/2022 | Scalisi |
| 2023/0045803 A1 | 2/2023 | Wallace |
| 2023/0108250 A1 | 4/2023 | Kraz et al. |

* cited by examiner

CAMERA WITH MICROPHONE MUTE RESPONSIVE TO MOVEMENT

CROSS REFERENCE TO RELATED APPLICATIONS

This application is a Continuation-in-Part of U.S. patent application Ser. No. 17/550,748, filed Dec. 14, 2021, entitled "Camera with Magnet Attachment to Display Panel" naming inventors Jace W. Files, Andrew P. Tosh, and John Trevor Morrison, which application is incorporated herein by reference.

This application is related to the application entitled "Camera with Dock Having Automated Alignment," naming Jace W. Files, Andrew P. Tosh, and John Trevor Morrison as inventors, filed Jan. 18, 2022, application Ser. No. 17/577,955, which application is incorporated herein by reference.

This application is related to the application entitled "Display Backplate to Facilitate Camera Magnet Attachment to a Display Panel," naming Jace W. Files and John Trevor Morrison as inventors, filed Jan. 18, 2022, application Ser. No. 17/577,957, which application is incorporated herein by reference.

This application is related to the application entitled "Camera with Magnet Attachment to Display Panel and Lightguide Housing," naming Jace W. Files, Andrew P. Tosh, and John Trevor Morrison as inventors, filed Jan. 18, 2022, application Ser. No. 17/577,960, which application is incorporated herein by reference.

This application is related to the application entitled "Camera Automated Orientation with Magnetic Attachment to Display Panel," naming Jace W. Files, Andrew P. Tosh, and John Trevor Morrison as inventors, filed Jan. 18, 2022, application Ser. No. 17/577,967, , which application is incorporated herein by reference.

This application is related to the application entitled "Reversible Chargeable Camera and Dock with Rear Wall Privacy," naming Jace W. Files, John Trevor Morrison, and Brandon J. Brocklesby as inventors, filed Jan. 18, 2022, application Ser. No. 17/577,968, which application is incorporated herein by reference.

This application is related to the application entitled "Camera Front Touch Sensor to Control Video Stream," naming Jace W. Files, Andrew P. Tosh, and John Trevor Morrison as inventors, filed Jan. 18, 2022, application Ser. No. 17/577,975, which application is incorporated herein by reference.

This application is related to the application entitled "Camera with Video Stream Disablement Responsive to Movement," naming Jace W. Files, John Trevor Morrison, and Andrew T. Sultenfuss as inventors, filed Jan. 18, 2022, application Ser. No. 17/577/986, which application is incorporated herein by reference.

BACKGROUND OF THE INVENTION

Field of the Invention

The present invention relates in general to the field of information handling system cameras, and more particularly to an information handling system camera with microphone mute responsive to movement.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often serve as communication devices, such as by supporting videoconferences with an integrated or peripheral camera. For example, portable information handling systems typically integrate a camera in an integrated display bezel of the portable housing that captures visual images in a field of view associated with an end user viewing the integrated display. Integrated cameras offer a convenient tool when an end user is mobile, however integrated cameras tend to have a limited utility due to the thin size of the portable information handling system housing that limits the size of the camera lens. Further, displays integrated in portable housings generally have a limited presentation area that restricts the amount of information displayed during a video conference. For example, a video conference can be a complex interaction with a large number of participants each presented in their own window and participating in an active conversation. In addition, video conferences also often reference shared documents that are presented alongside conference participants.

When possible end users tend to prefer interacting with video conferences through peripheral displays that interface with information handling systems and offer a larger viewing area. A large peripheral display provides an end user with ready access to an entirety of a video conference, such as by showing multiple windows with each window having a conference participant and showing presentations discussed by the participants. Although an end user may rely upon an integrated camera of a portable information handling system to present an image of the end user in the videoconference, often end users prefer to use a peripheral camera associated with a peripheral display that provides better image quality. Some peripheral displays integrate a camera, however, more often a peripheral camera will be used with a peripheral display since the peripheral camera offers room for higher quality camera lens. Typically, a peripheral camera is placed on a bracket coupled to the display and directed towards an area in front of the display where an end user will view the display. Often the brackets can couple at different positions of the display perimeter and can swivel to adjust the camera field of view. In some cases, the cameras can also couple to a stand that rests in front of a display that an end user can move to different locations on a desktop. As video conferences have grown more common and involved more important subject matter, some end users have begun to use high end DLSR and similar cameras, such as to support executive meetings.

One difficulty with the use of peripheral cameras is that they are difficult to place with larger peripheral displays. Coupling a camera to a display perimeter results in an end user viewing a display area away from the camera field of view axis so that other video conference participants receive a visual image of the end user looking away from the camera even though the end user is viewing the video conference. Thus, although a large display viewing area makes a videoconference easier to view, the larger display perimeter increases the angle at which a camera views an end user relative to the end user gaze at a video conference. The result is an unnatural image of the end user presented to the remainder of the videoconference as the end user gazes directly at other participants but has an image captured of the end user looking away from the camera. One solution is to place the camera on a stand in front of the display, however this tends to block the end user's viewing and interfere with desktop surface usage.

SUMMARY OF THE INVENTION

Therefore, a need has arisen for a system and method which places a camera at a video conference window to capture images of an end user both looking at the camera and the video conference window.

In accordance with the present invention, a system and method are provided which substantially reduce the disadvantages and problems associated with previous methods and systems for placing a camera at an information handling system display to support capture of visual images for a videoconference. A camera has a lens disposed at a housing first end and a magnet disposed at an opposing end, the magnet providing magnetic attraction to hold the camera against a display panel surface so that the camera captures visual images with a field of view originating a display panel front surface. Automated presentation of an active speaker videoconference window near the camera provides an improved videoconference interaction as the end user has an image captured with the end user looking at the camera while viewing the active speaker at the display.

More specifically, an information handling system processes information with processing components disposed in a housing, such as processor and memory that cooperate with a graphics processor to present information as visual images at a display. An application executing on the processor presents visual information for a videoconferencing application in one or more windows and sends visual images captured by a camera to other videoconferencing participants. The camera is built into a cylindrical housing having the camera lens exposed at one end and having a magnet disposed at an opposing end. The magnet attracts to ferromagnetic material of a backplate disposed behind the display panel so that the camera couples to the face of the display panel with the lens facing an end user of the display. The camera position is detected and reported to the information handling system so that videoconference presentations of visual images are coordinated with the camera position. For instance, as an active speaker changes at the videoconference the active speaker window is snapped to the position of the camera to have the end user appear to be looking into the camera at all times while also viewing an active speaker at all times.

The present invention provides a number of important technical advantages. One example of an important technical advantage is that a camera magnetically couples to a display panel front face at a location viewed by the end user so that the end user can simultaneously look towards the camera while watching content of interest, such as an active speaker of a video conference. The camera has a minimal size and blends into the display presentation, such as by including translucent light guide material in the housing that passes illumination of the display towards the camera front. A touch surface on the camera allows an end user to command a camera or microphone pause, a power off, or other functions. In one embodiment, camera magnetic attraction at a display panel is enhanced by adding structure to the backplate with ferromagnetic material proximate to the display panel. Disruption to captured visual and audio information during movement of the camera is minimized by pausing video and audio capture when movement of the camera is detected.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system camera magnetically attaches to a display panel front face. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
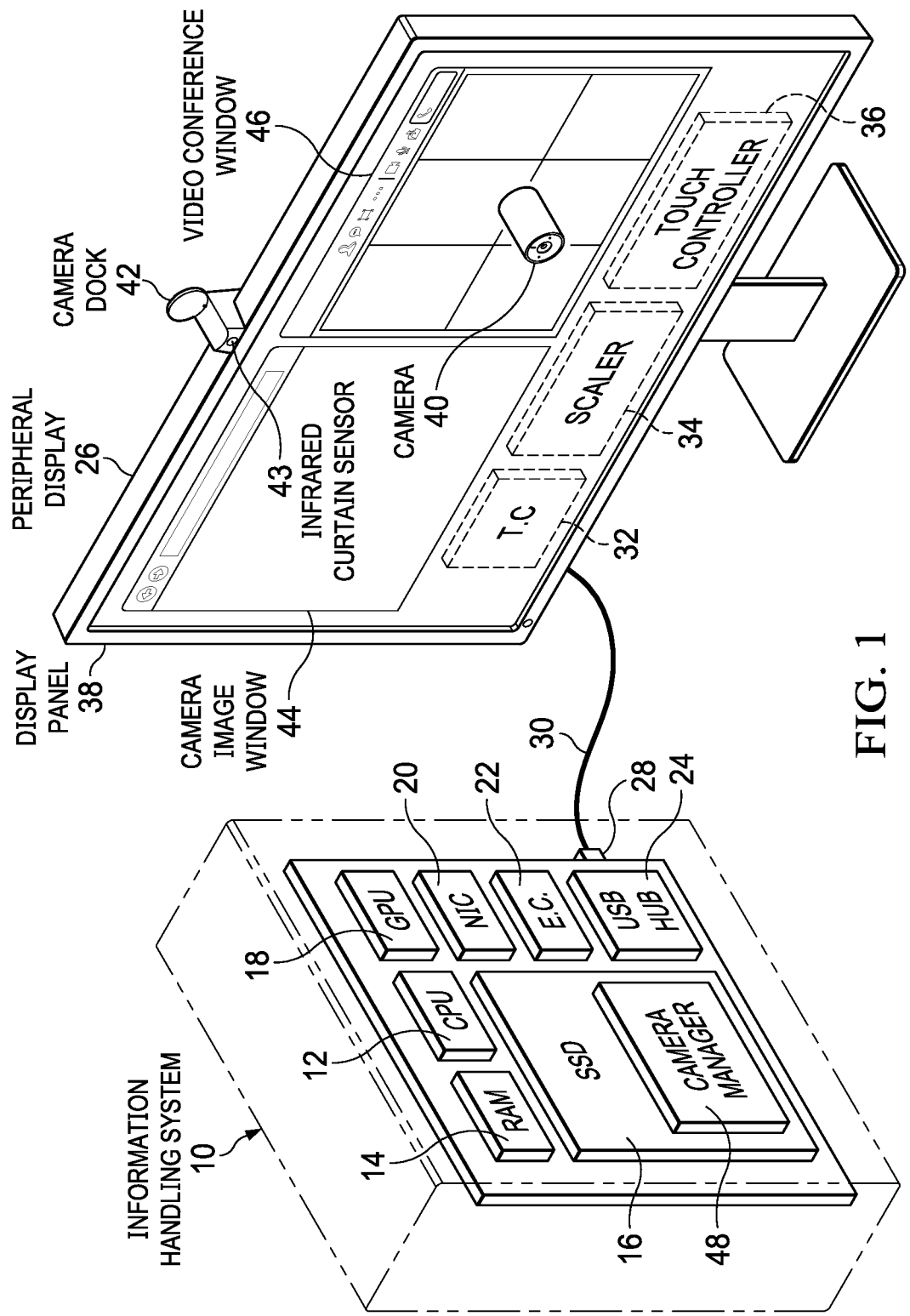
FIG. 1 depicts an information handling system peripheral camera magnetically attached to a display panel front face.

Referring now to FIG. 1, an information handling system 10 peripheral camera 40 magnetically attaches to a display panel front face. In the example embodiment, information handling system 10 has a stationary or desktop configuration that presents information as visual images at a peripheral display 26. Information handling system 10 processes information with processing components that cooperate to execute instructions. A central processing unit (CPU) 12 executes instructions to process the information with the instructions and information stored in random access memory (RAM) 14. For example, operating system instructions stored in non-transitory memory of a solid state drive (SSD) 16 are retrieved to RAM 14 at power up and executed to coordinate execution of applications, such as a video conference application. A graphics processing unit (GPU) 18 interfaces with CPU 12 to further process information into pixel values that define visual images presented at peripheral display 26. For instance, pixel values are communicated from GPU 18 through a USB hub 24 and USB Type-C port 28 through a display cable 30 to peripheral display 26 for presentation as visual images. Alternatively, GPU 18 can communicate pixel values through a wireless interface provide by network interface controller (NIC) 20, such as a WiFi, Bluetooth or 60 GHz interface. An embedded controller (EC) 22 manages the processing component operations on a physical level, such as the application of power, maintaining thermal constraints and supporting interactions with peripheral devices like a keyboard and a mouse.

Peripheral display 26 manages presentation of visual images with a timing controller 32 that scans pixel values across pixel rows and columns of a display panel 38 and a scalar 34 that scales visual information to the resolution used by display panel 38. Processing resources available on timing controller 32 and/or scalar 34 execute logic that manages presentation of visual images, such as controlling brightness, contrast and other settings. A touch controller 36 interfaces with a capacitive touch sensor disposed in display panel 38 to detect touches made at the display panel. For example, touch controller 36 communicates touch inputs to embedded controller 22, which further communicates the touches as inputs to CPU 12 for use as inputs to the operating system or applications running over the operating system.

In the example embodiment, peripheral display 26 presents visual images associated with a videoconferencing application executed on information handling system 10 and supported by a peripheral camera 40 magnetically attached at the front face of display panel 38. Camera 40 captures visual images that are communicated to information handling system 10 through a wireless interface, such as WiFi, for presentation in a camera image window 44. For example, a video conference window 46 presents a video conference participant at peripheral display 26 co-located with a position of camera 40 at the display panel front face so that an end user looks at the camera when addressing the video conference participant. Camera image window 44 presents the visual image captured by camera 40 for reference by the end user off axis from the location of camera 40. This allows an end user to visually scan his own appearance while maintaining eye contact primarily into camera 40 when looking at and talking to video conference window 46. A camera manager 48 executing on CPU 12, such as part of the operating system or videoconference application, manages placement of windows at peripheral display 26 to promote end user eye contact with the camera, as is described in greater depth below. A camera dock 42 couples to the upper side surface of peripheral display 26 to accept camera 40 when an end user does not desire to have the camera coupled to the display panel front side. Camera dock 42 provide a charge to camera 40, such as with a wireless charger, and includes an infrared curtain sensor 43 that illuminates the front face of display panel 38 with infrared light and senses reflections to determine a location of camera 40 at a front face of display panel 38. As is described in greater depth below, the location of camera 40 detected by I/R curtain sensor 43 and/or touch controller 36 allows selection of a presentation location of videoconference window 46 so that an end user viewing a videoconference maintains eye contact with camera 40.

Figure 2A:
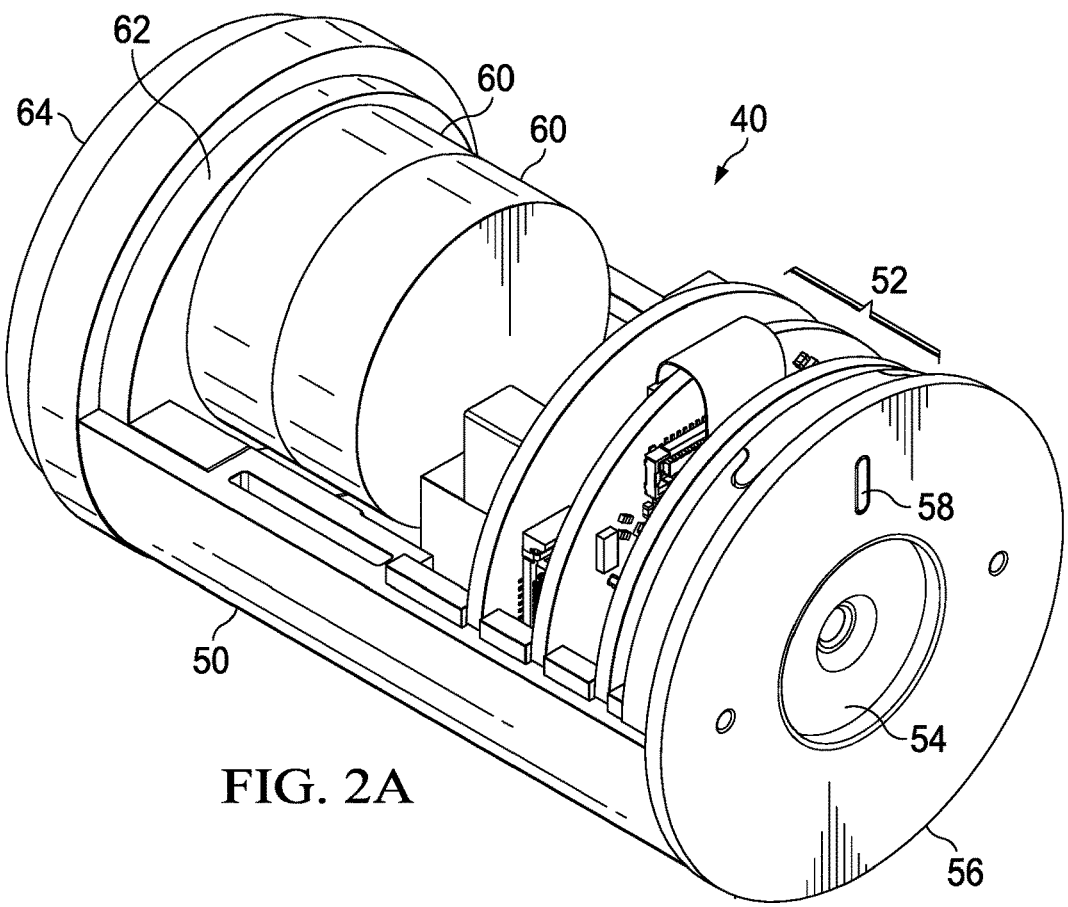
FIGS. 2A and 2B depict perspective and side sectional views of the camera magnetic attraction structure to couple the camera to a display panel front surface.
Figure 2B:
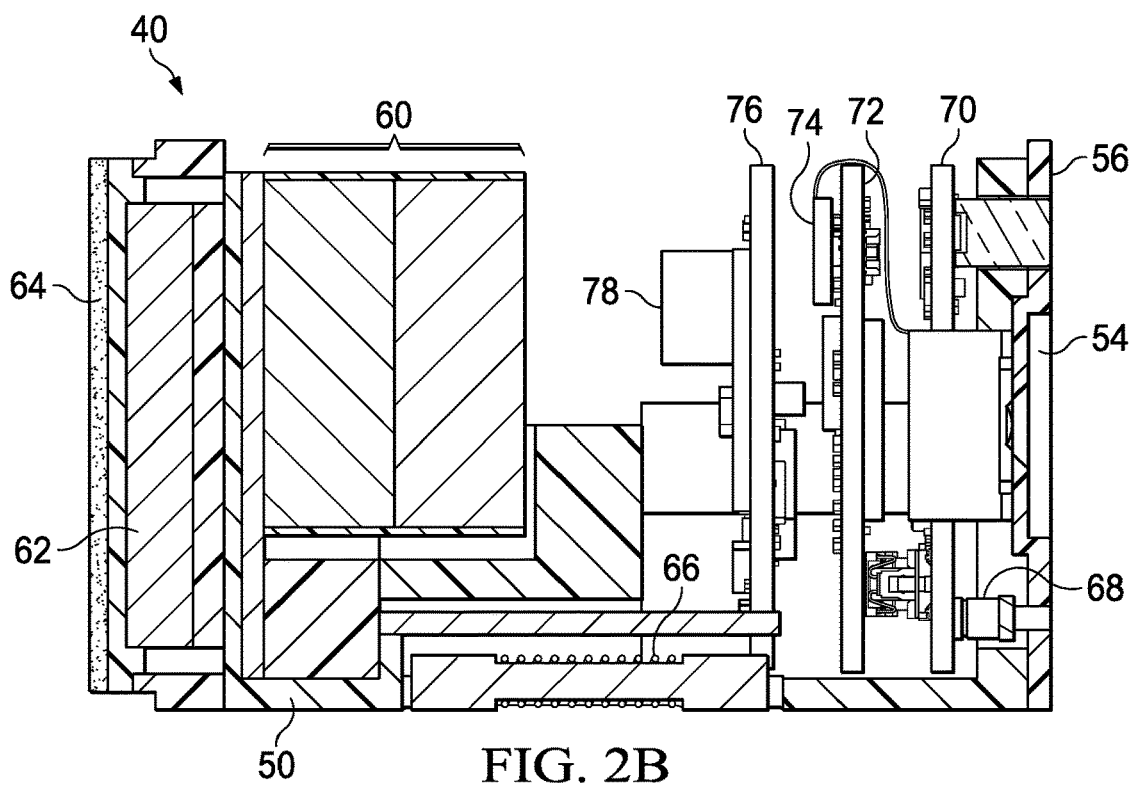

Referring now to FIGS. 2A and 2B, perspective and side sectional views of camera 40 depict a magnetic attraction structure to couple camera 40 to a display panel front surface. FIG. 2A depicts an upper perspective view of camera 40 having the top portion of camera housing 50 removed to illustrate internal components. A camera module 52 includes a light sensor 68 and processing resources disposed on three separate printed circuit boards that cooperate to capture visual images through a lens 54 exposed at a front touch surface 56 of housing 50. An orientation LED provides illumination as an indication of camera orientation when coupled to a display front face. Batteries 60 fit in camera housing 50 to provide power for operation of camera module 52. A magnet 62 is disposed at a rear side of camera housing 50 opposite front touch surface 56 and between batteries 60 and a rear cushion surface 64. In the example embodiment, camera housing 50 has a cylindrical shape with weight distributed towards the rear side so that magnet 62 provides a secure attraction against the display panel. Rear cushion surface 64 is, for example a thin, soft rubber material that minimizes risk of scratches to the display panel and has sufficient friction to maintain camera 40 at a location on the display panel against gravitational force that works to slide camera 40 to the bottom of the display. Front touch surface 56 includes a capacitive sensor that detects end user touches as inputs, such as to turn off and on visual image capture, mute the camera microphone and power the camera on and off.

FIG. 2B depicts a cutaway view of camera 40 illustrating the configuration of camera module 52 within camera housing 50 and the spatial relationship of magnet 62 to rear cushion surface 64. Magnet 62 is placed at the end of camera housing 50 to reduce the distance between magnet 62 and ferromagnetic material of the peripheral display for optimal magnetic attraction. Similarly, rear cushion surface 64 has a minimal thickness and compresses somewhat at contact with the display panel to optimize magnetic attraction. In an embodiment in which camera 40 couples to a curved display, the rear surface and magnet may have curved exterior surface that conforms to the display shape. The example has two cylindrical batteries 60 that fit into the interior of camera housing 50 to help maintain housing structural integrity. Camera module 52 has a charger board 76 that couples a charger 78 for managing battery charge and discharge. Charger board 76 interfaces with a wireless charger 66 disposed at a bottom surface of camera housing 50 to accept wireless charging signals from a wireless charging element disposed in the camera dock. Camera module 52 includes a controller circuit board 72 having a controller 74 with processing resources and non-transitory memory to execute instructions from managing camera operations. A camera circuit board 70 supports a light sensor 68 that captures visual images from lens 54 and provides the visual information to controller board 72 for communication to an information handling system, such as through a wireless network interface controller coupled to the controller board.

Figure 3:
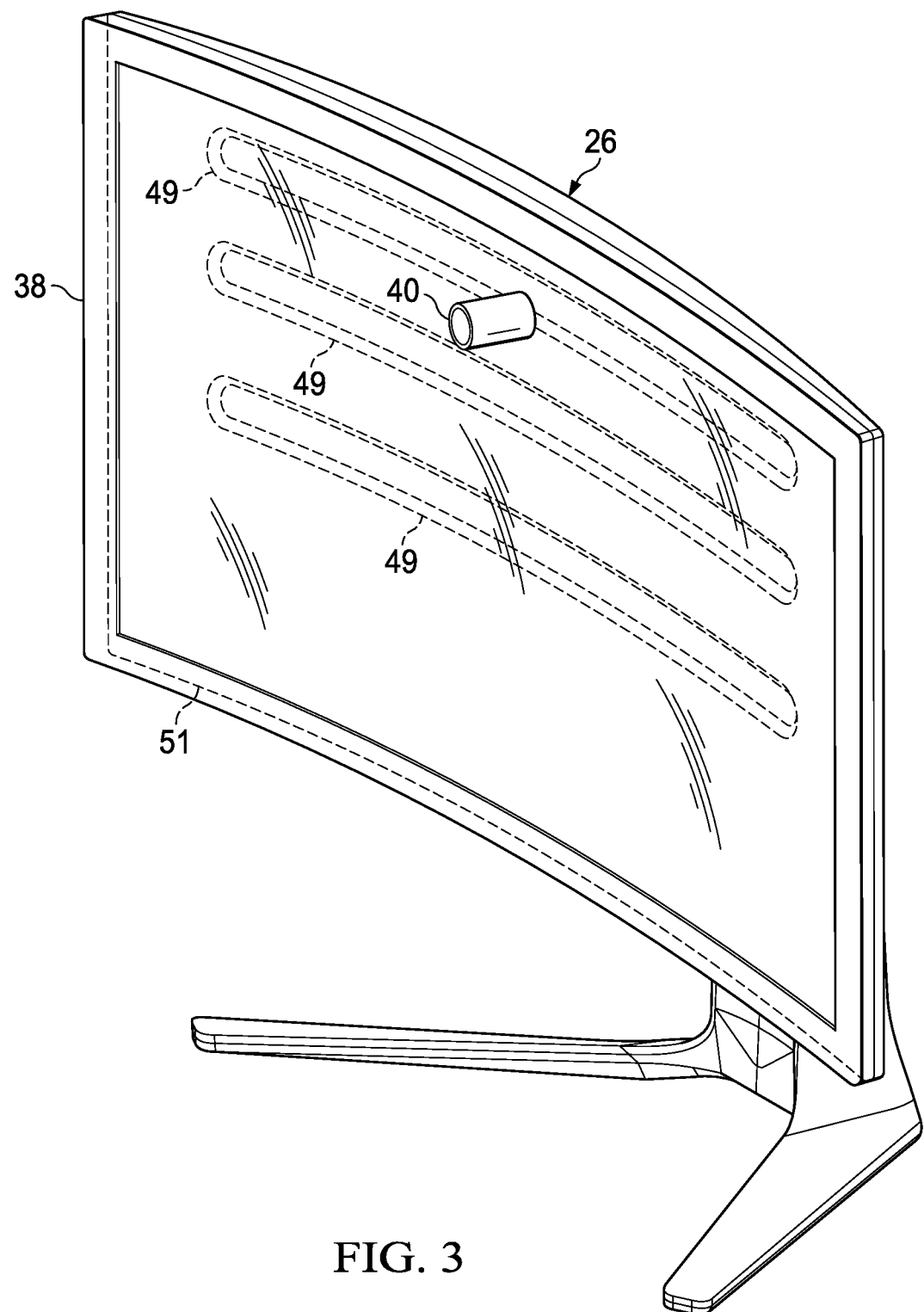
FIG. 3 depicts a side perspective view of a peripheral display with the display panel removed to illustrate the camera interacting with a ferromagnetic backplate to maintain a position on the display panel.

Referring now to FIG. 3, a side perspective view of peripheral display 26 with the display panel 38 removed illustrates camera 40 interacting with a ferromagnetic backplate 51 to maintain a position on the display panel. Ferromagnetic backplate 51 shapes and supports display panel 38, such as to hold a backlight in position behind the display panel. Backplate support ridges 49 formed in ferromagnetic backplate 51 help to stiffen the backplate. Magnetic attraction between the magnet within camera 40 and ferromagnetic backplate 51 holds camera 40 in place against display panel 38. Ferromagnetic backplate 51 is dispersed fairly evenly behind display panel 38 so that camera 40 may be placed at any desired position across the front face of display panel 38.

Figure 4:
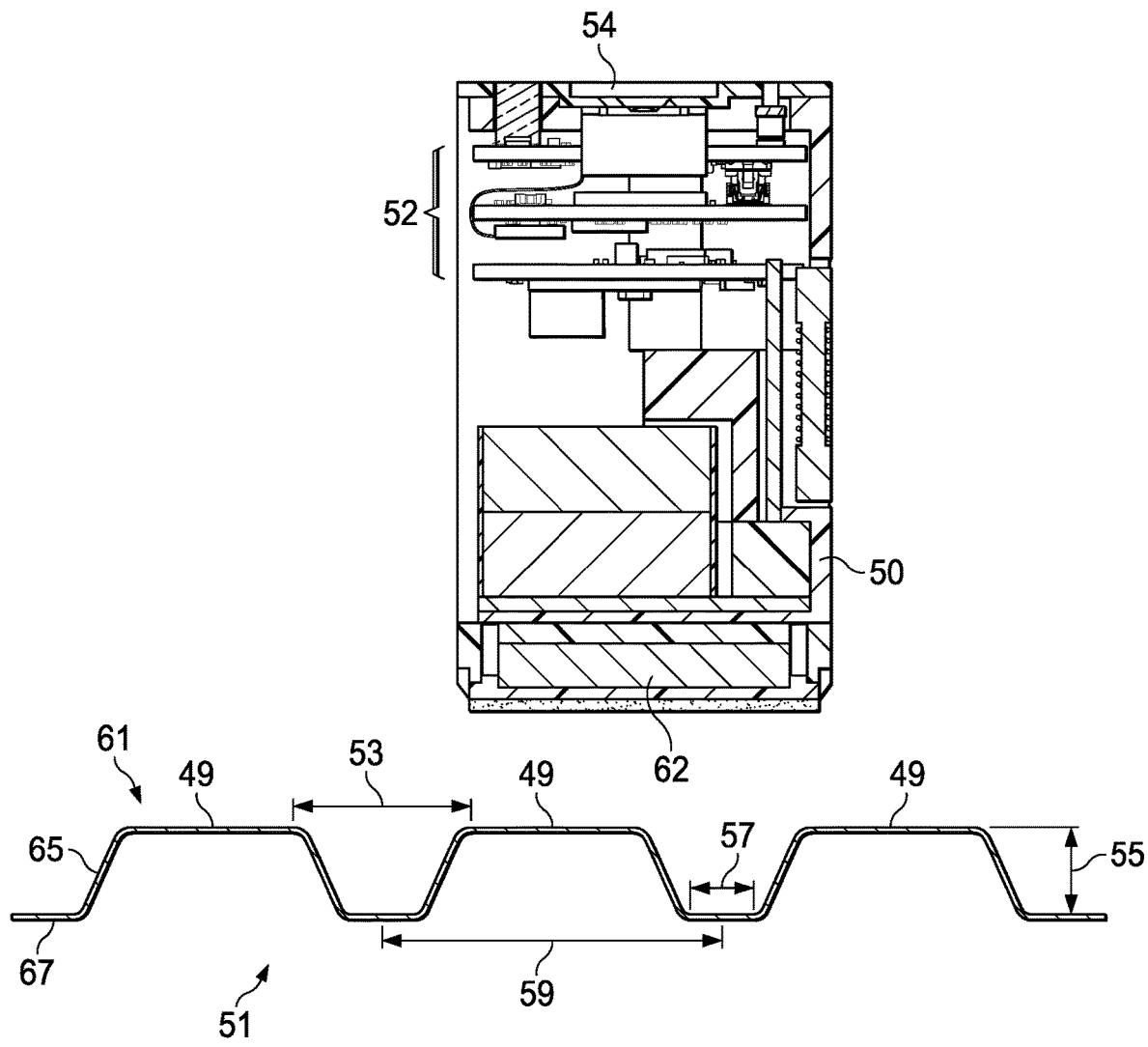
FIG. 4 depicts a side sectional view of an example of a display backplate and backplate support ridges that enhance magnetic attraction of a camera to a display panel.

Referring now to FIG. 4, a side sectional view depicts an example of a display ferromagnetic backplate 51 and backplate support ridges 49 that enhance magnetic attraction of camera 40 to a display panel. Camera 40 is oriented with camera module 52 and lens 54 directed away from the display panel and magnet 62 directed towards ferromagnetic backplate 51. In the example embodiment, backplate support ridges 49 have a closer proximity to magnet 62 along a top flange 61 than does a bottom flange 67. An angular web section 65 between top flange 61 and bottom flange 67 defines a pattern having top rib opening 53 and a bottom rib opening 57 that are sized to provide a relatively set amount of ferromagnetic material surface area in proximity to magnet 62 across the surface of the display panel located between the top flange surface 61 and magnet 62. The depth 55 is set along with the angular web 65 to provide a desired mechanical strength of ferromagnetic backplate 51 while the length of top flange 61 and bottom flange 67 have a total length along with an upward and downward stretch of angular web 65 to have substantially the length of magnet 62 so that magnetic attraction of magnet 62 remains substantially consistent across the display panel surface. In alternative embodiments as the size of magnet 62 changes alternative configurations of top flange and rib opening sizes may be used to maintain a proportional arrangement of ferromagnetic material and magnet surface area. For example, multiple smaller top flange areas may be distributed within each magnet surface area in proportion to the magnet area.

Figure 5:
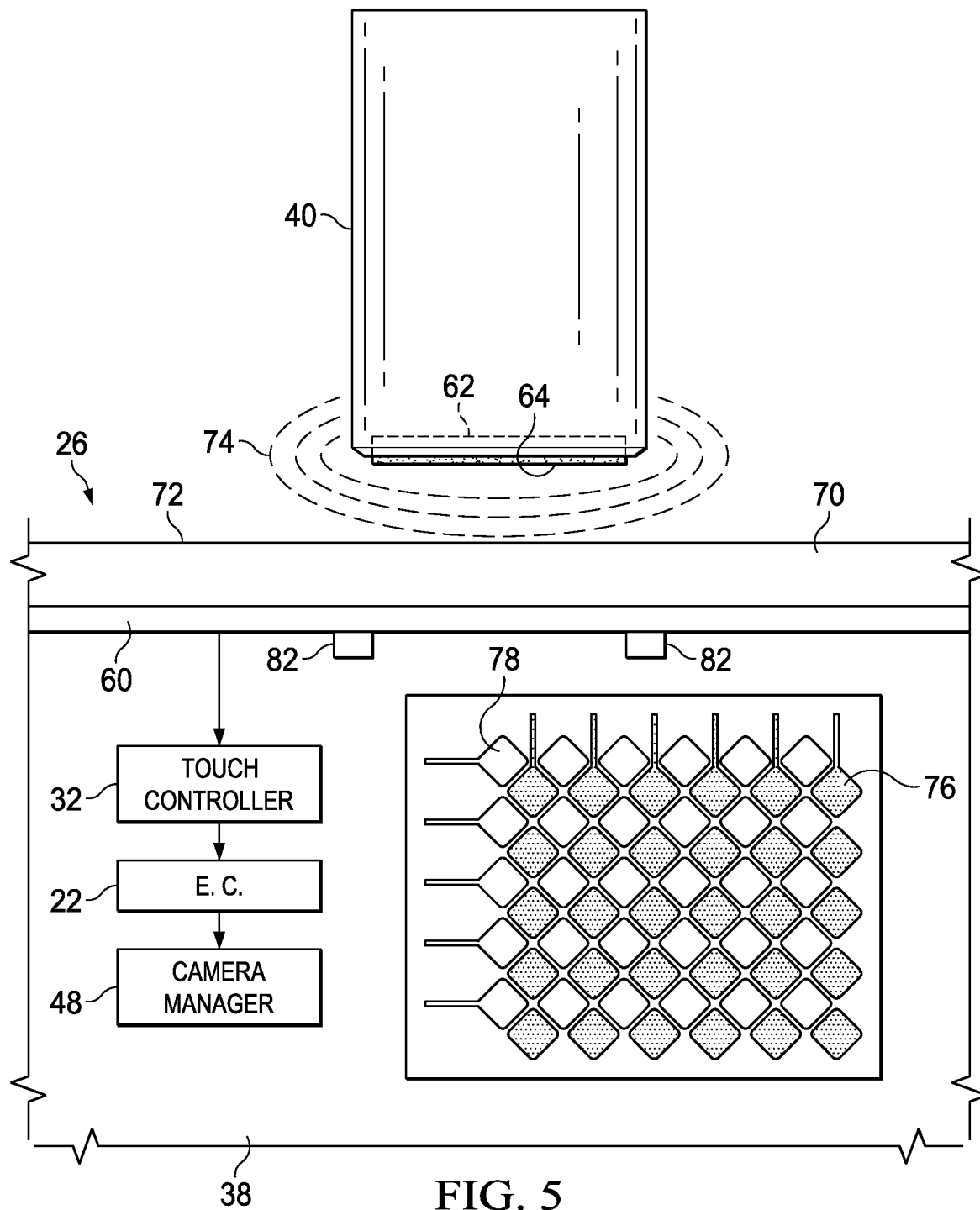
FIG. 5 depicts a block diagram of a system for display presentation awareness of a camera location on a display panel.

Referring now to FIG. 5, a block diagram depicts a system for display presentation awareness of a camera location on a display panel. In the example embodiment, a peripheral display 26 has a display panel 38 that includes a touch detection layer 70 disposed under a protective cover 72 that contacts camera 40 and detects positions of camera 40 with changes at an electric field 74. As described above, magnet 62 presses rear cushion surface 64 against protective cover 72 in response to a proximity of ferromagnetic material of the display backplate. Touch detection layer 70 may detect camera 40 in a variety of ways. In one example embodiment, a capacitive touch detection surface used to detect end user touch inputs identifies the camera by the shape of the housing at the touch detection surface. For instance, the location is based upon force sensed at an intersection of transparent electrode layers 76 and 78 included in a glass substrate 80. Force sensing, such as with Sensel detection, may be used to differentiate the camera based upon a detected force that matches the expected force of magnetic attraction. Other example embodiments detect the camera position with an infrared curtain disposed in the camera dock and aligned parallel with the display panel surface. Infrared reflections from the camera and sensed by the infrared curtain provide an angular position to the camera and, with time of flight, a distance to the camera. A similar alternative to the infrared curtain is an ultrasound or sonar detection system. In the example embodiment of FIG. 5, Hall sensors disposed behind the display cover sense the proximity of the magnet to indicate a camera position. Camera position touches detected by touch controller 32 are forwarded to embedded controller 22, which analyzes the touches to confirm a camera presence and reports the camera position to camera manager 48. Once camera manager 48 has the camera position, adjustments may be made to presented visual images to optimize the end user experience with camera interactions.

Figure 6:
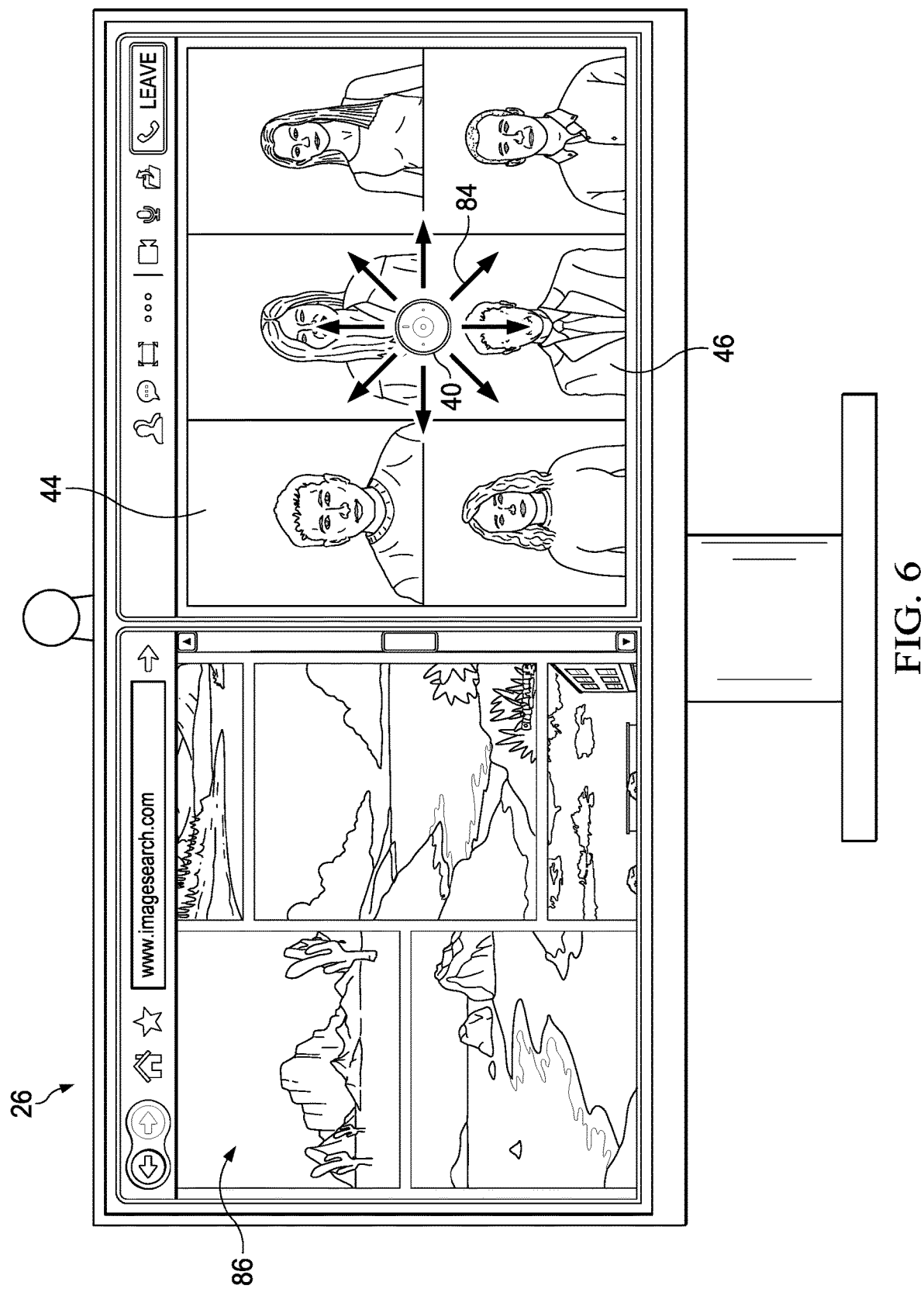
FIG. 6 depicts an example presentation of a videoconference at a display with a camera magnetically attracted to the display front surface.

Referring now to FIG. 6, an example presentation depicts a videoconference at a display with a camera magnetically attracted to the display front surface. In the example video conference presentation, a camera image window 44 presents the visual image captured by camera 40 showing the end user who is participating in the videoconference while viewing peripheral display 26. An active participant who is speaking at the videoconference is presented in a video conference window 46 located directly under camera 40 so that the end user looks at the camera when looking at the speaker's visual image. Arrows 84 depict directions in which camera 40 may be moved by an end user during the videoconference. A supplemental presentation 86, such as talking points, is presented at the left half of peripheral display 26. In various embodiments, the camera manager adjusts the presentation of videoconference windows based upon conditions of the videoconference, the position of camera 40 and movement 84 of camera 40. For example, when camera 40 is positioned among a group of videoconference participants, an active speaker window may snap to the location of camera 40 as the speaker changes so that the end user always appears to be looking at the camera and the active speaker. As another example, if the end user moves camera 40, the camera manager moves an active speaker window with the camera position so that the active speaker window remains collocated with the camera. As another example, when an active speaker references a presentation, the presentation may collocate with the camera. Other types of camera and presentation coordination may be used based upon end user preferences.

Figure 7C:
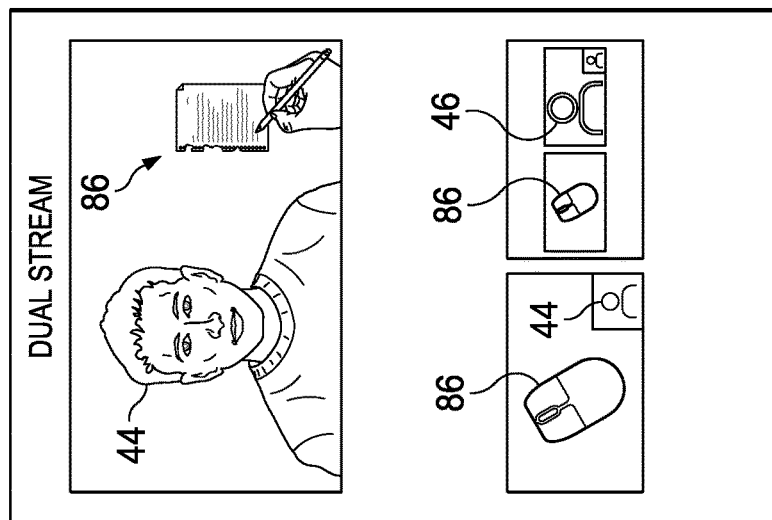
FIGS. 7A, 7B and 7C depict alternative embodiments for presentation of videoconference content based upon camera position.
Figure 7B:
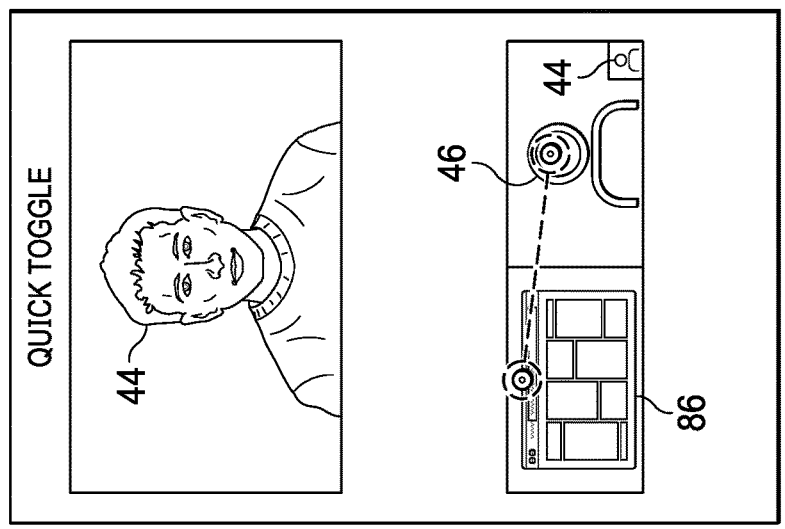
Figure 7A:
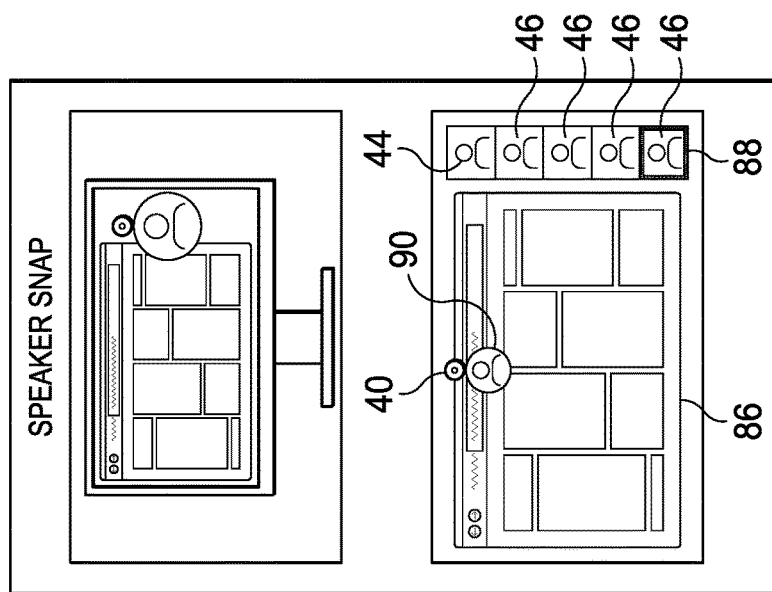

Referring now to FIGS. 7A, 7B and 7C, alternative embodiments for presentation of videoconference content based upon camera position are depicted. FIG. 7A depicts a speaker snap mode of videoconference window manipulation in response to changes in active speaker. At one side of the display the end user's camera image 44 is presented in a fixed position along with other video conference participant windows 46 and with a presentation 86 shown at a central location of peripheral display 26. An active speaker indication 88 in the line of video conference participants highlights which participant is speaking while that active speaker is also presented in an active speaker window 90 located proximate camera 40. As the active speaker changes, active speaker indicator 88 highlights the active speaker's videoconference window and the active speaker's visual image is snapped to active speaker window 90 for presentation to the end user proximate the location of camera 40. The speaker snap mode keeps the end user gaze in a central location and at camera 40 as the videoconference dynamics change which participants are active. If an end user changes the camera position during the videoconference, the position of the active speaker window snap may adjust to the new camera position based upon user settings and preferences. FIG. 7B depicts an example embodiment having a quick toggle option selectable by an end user to transition between a multi-user speaker snap presentation of FIG. 7A to a more focused interaction centered on a selected end user or presentation. For example, if the end user wants to focus on a main presenter, a quick toggle selection presents a selected video conference window 46 at the camera location along with the end user camera image 44 and optionally a presentation 86. FIG. 7C depicts another example embodiment with an optional dual stream presentation. For example, camera 40 may attach to a stand by magnetic attraction to have an end user written presentation 86 presented along with a separate captured image provided by a camera 40 coupled to the display. Intelligent placement of camera and video conference windows may be promoted with analysis over time of end user camera interactions in different videoconference environments.

Figure 8A:
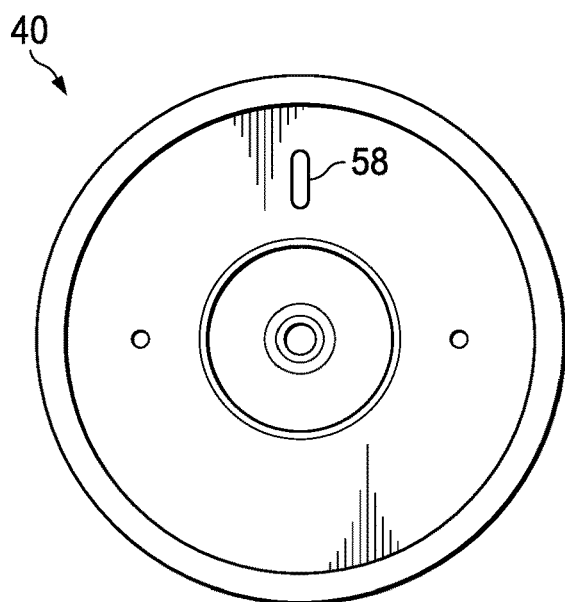
FIGS. 8A, 8B and 8C depict an example embodiment of the camera having automated orientation indications at the camera front touch surface provided by an orientation LED.
Figure 8B:
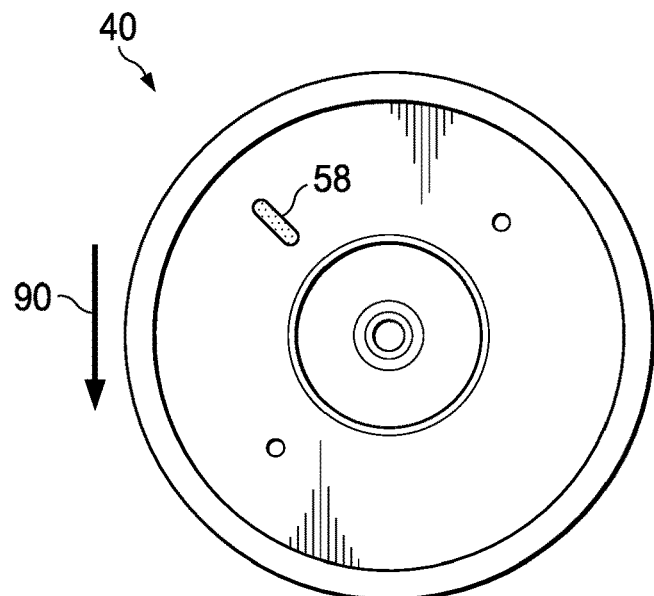
Figure 8C:
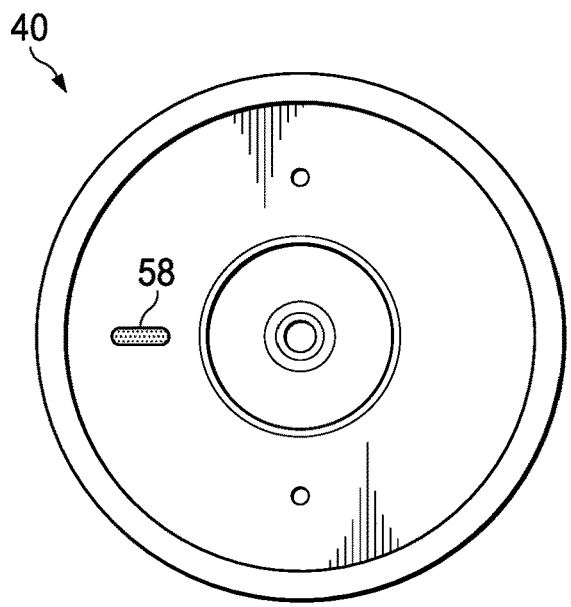

Referring now to FIGS. 8A, 8B and 8C, an example embodiment of camera 40 is depicted having automated orientation indications at the camera front touch surface provide by orientation LED 58. When camera 40 couples to a front surface of a display panel, the orientation is not set by a bracket and can therefore vary about a full 360 degrees. Autoframing software in the camera can correct the captured camera image in an automated way so that an end user captured by the camera is presented in an upright orientation independent of the captured orientation, however, autoframing can reduce image resolution and can introduce latency to streaming images. To reduce or even eliminate the use of autoframing, orientation LED 58 provides a visual indication at the camera front face of the orientation of an image captured by the camera. FIG. 8A depicts an example of a white (or green) light provided by orientation LED 58 when the captured visual image has an upright orientation, such as within two degrees of exactly upright relative to gravitational orientation 90. FIG. 8B depicts an example of a yellow light provided by orientation LED 58 when the orientation is close to upright, such as within 2 to 5 degrees of alignment with gravitational orientation. FIG. 8C depicts an example of a red light provided by orientation LED 58 when the camera orientation is greater than a defined amount off of alignment with gravitational orientation, such as greater than five degrees. The example embodiment presents different colors to indicate alignment orientation relative to gravity, however alternative embodiments may use different types of indications, such as a length of the light, a flashing versus steady light, or extinguishing the light when upright orientation is achieved so that the light does not distract an end user. In addition, an upright indication may be provided at other than a pure upright orientation. For example, an exactly inverted orientation or an exactly perpendicular orientation may also be given an upright indication where autoframing from these orientations do not impact image quality of video steam latency.

In the example embodiment, the orientation indication is driven by an accelerometer or gyroscope that detects an upright orientation relative to gravitational force. Alternatively, orientation may be detected by including an upright indication at the rear surface of camera 40 that is detected by the display touchscreen. In one alternative embodiment, a gimbal system is included in camera 40 and interfaced with accelerometer and/or gyroscope to rotate the camera module within the camera so that the camera module automatically rotates to a vertical orientation regardless of end user placement on the display by magnetic attraction. In such an embodiment, orientation LED 58 may illuminate to indicate when the gimbal has achieved the correct orientation.

Figure 9A:
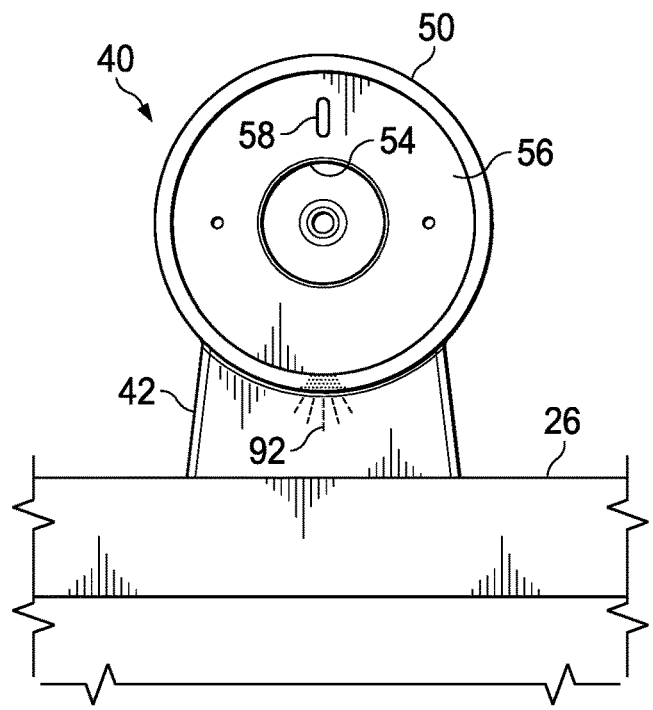
FIGS. 9A, 9B, 9C, 9D and 9E depict examples of camera dock support for holding a camera at a display, indicating a charge state of a camera, providing privacy for the camera and passing display illumination through the camera.
Figure 9B:
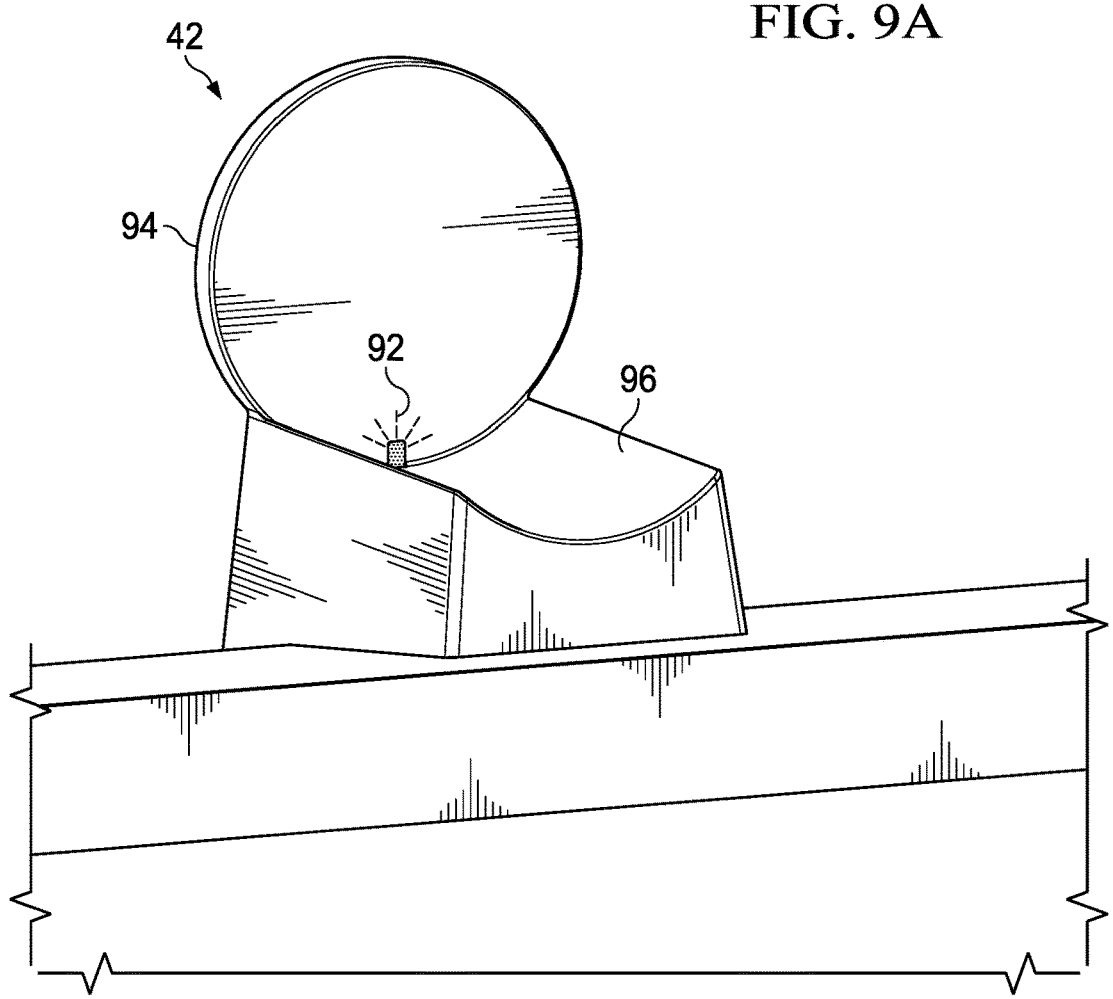

Referring now to FIGS. 9A, 9B, 9C, 9D and 9E, examples are depicted of camera dock support for holding a camera at a display, indicating a charge state of a camera, providing privacy for the camera and passing display illumination through the camera. FIG. 9A depicts a front elevation view of camera 40 placed in camera dock 42 with alignment LED 58 indicating an upright alignment. Lens 54 is exposed to capture visual images while in camera dock 42 and front touch surface 56 is exposed to accept touch inputs, such as inputs that command camera power on or off, camera image capture off, microphone mute or other desired inputs. At the bottom side of camera 40 a red charging indicator LED 92 illumination is provided to indicate that the camera is charging. As is described in greater depth below camera orientation in camera dock 42 is automatically biased to place orientation LED at an upper side with the camera having a vertical orientation relative to gravity so that wireless charging is aligned. Charging indicator 92 presented at the front face of camera 40 is provided by a red LED placed at the rear of camera dock 42 that projects illumination through a translucent material at the outer surface of camera housing 50. FIG. 9B depicts camera dock 42 with the camera removed. A cradle 94 has a semicircular shape matched to the radius of the camera housing so that the camera rests securely in camera dock 42 to receive a wireless charge. A privacy back support 94 is raised from cradle 96 and has a circular shape matched to the camera radius. A charging indicator LED 92 is disposed at the rear side of cradle 96 at the intersection with privacy back support 94 and aligned to direct illumination into the camera housing so that the translucent camera material presents the illumination at the camera front face.

Figure 9C:
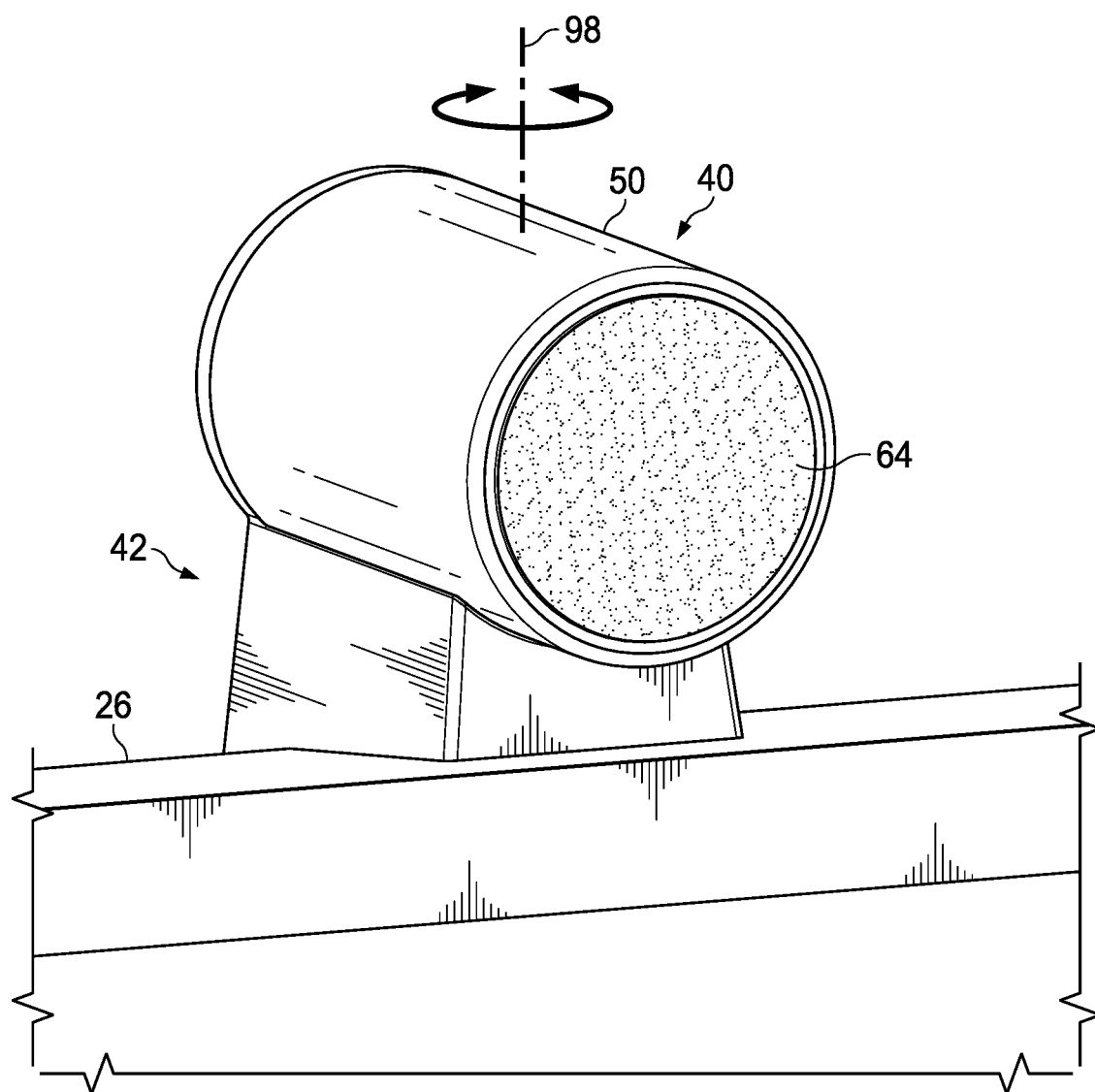

FIG. 9C depicts camera 40 rotated 180 degrees as indicated by arrows 98 in camera dock 42 to secure the camera against capture of unauthorized visual images. Camera 40 rests in camera dock 42 to have rear cushion surface 64 exposed at the front of camera 40. Camera 40 may still charge in the reversed position, as is described in greater depth below, and charging indicator LED 92 is visible through housing 50 when illuminated. When camera 40 reverses in camera dock 42 the camera lens presses against privacy back support 94 so that image capture is prevented. In addition, a microphone at the camera front face is physically blocked so that audible sounds are muted. In one embodiment, camera 40 detects a reversed position, such as with a magnetic relationship related to wireless charging or blocking of light at the lens, and commands a power down or disabled state for the camera module and microphone. In an alternative embodiment, a microphone may be placed at the rear face of camera 40 so that audio capture may be selected when visual image capture is disabled. Reversing camera 40 in camera dock 42 provides an end user with a definitive visual indication of a secured camera and a simple mechanical interaction to rapidly reactive the camera by reversing the camera orientation. In one alternative embodiment, the camera settings may allow an end user to select whether the microphone is muted or disabled based upon the position of camera 40 in camera dock 42. In another alternative embodiment, a camera setting allows an end user to disable camera 40 when camera dock 42 has a predetermined position, such as at the top of display 26, whether or not camera 40 docks in a front-facing or rear-facing orientation. In such an embodiment, a default setting may have camera 40 remain active when in a front facing position so that the camera supports videoconferencing when docked. In another alternative embodiment, camera 40 may disabled by disconnecting from a wireless interface, such as WiFi, so that captured visual images cannot be communicated but are still captured.

Figure 9E:
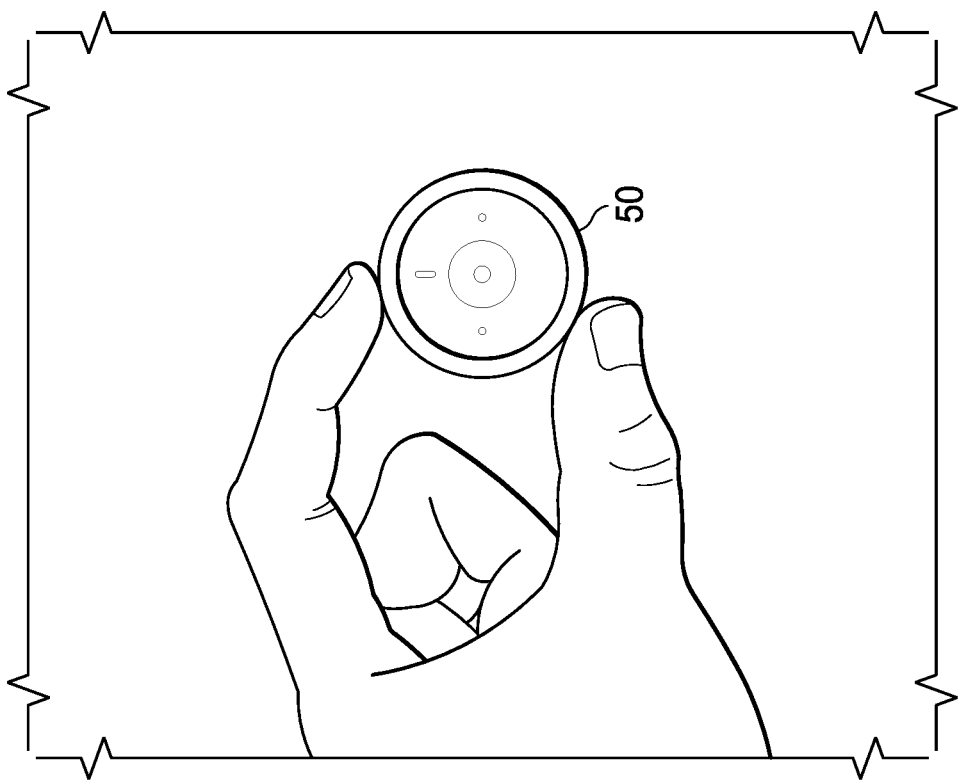
Figure 9D:
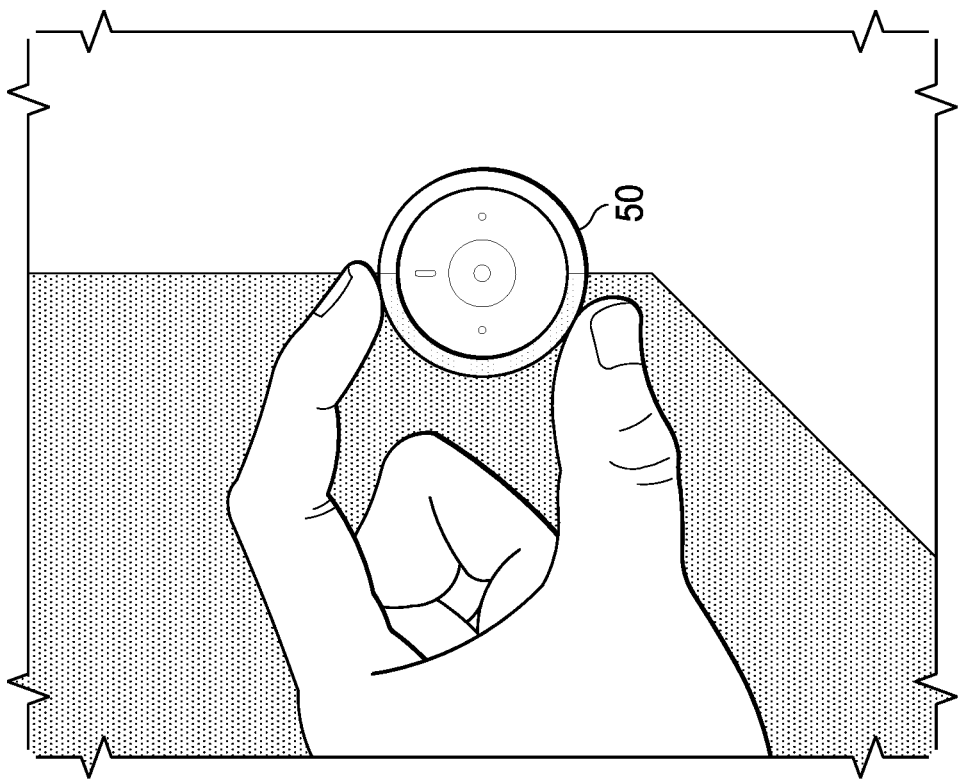

FIGS. 9D and 9E illustrate an additional usage case for camera 40 with a translucent housing 50 that presents light entering at the housing rear as visual light at the housing front side. Camera housing 50 acts as a light pipe that allows an underlying display presentation to transfer colors through the outer edge of camera housing 50 for a variety of visual effects. For example camera housing 50 is an extruded single piece that is seamless and has a light guide translucent plastic to promote light transmission. In one embodiment, light transmission may be further encouraged with a reflective coating at the interior surface of camera housing 50. Figure D illustrates an example of camera 40 disposed on a display between a break of first and second colors so that the camera blends into the display presentation with underlying color presented at the respective portions of the housing. FIG. 9E illustrates an example of camera disposed on a display having a uniform color of a light presentation so that camera 40 blends into the display as part of the display and less disruptive to an end user. Coordination between the display and camera provides additional functionality for camera 40 by presenting information related to camera operations with the display at the rear side of camera 40 so that the information is presented at the camera housing. As an example, display 26 may guide an end user to an upright orientation of camera 40 by presenting an orientation indication behind the camera that shows through the light guide of the camera housing. For instance, a touch screen capacitive sensor may provide a camera location so that the information is presented proximate the camera. When an end user touches the camera to change the orientation, additional information may be presented at the display to help, such as an arrow to indicate a rotation direction to upright and a user interface on the display for the amount of rotation. During a videoconference, content posted by the camera is of particular interest to the end user, such as window with an active participant or a presentation, so that alerts provided with illumination at the camera housing are helpful for getting prompt end user attention. For instance, a low battery or dropped call indication may be provided with a red or yellow light that illuminates from behind the camera and through the camera housing. In alternative embodiments, other alerts may be provided and a touch at the camera may be used to bring presentation of related information to the display, such as battery charge state and a list of video conference participants.

Figure 10:
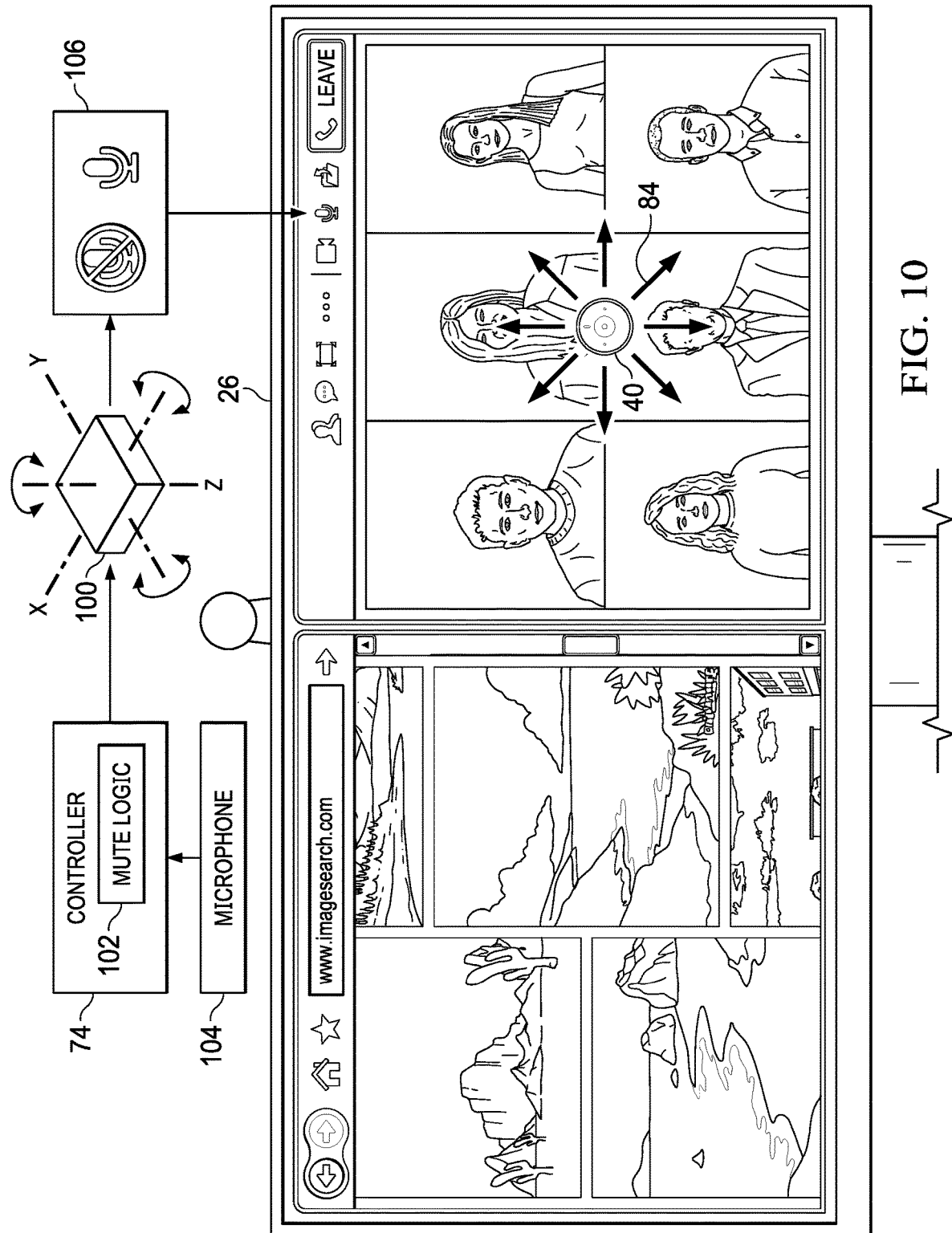
FIG. 10 depicts a block diagram of an example camera implementation having an audio mute during camera movement.

Referring now to FIG. 10, a block diagram depicts an example camera implementation having an audio mute during camera movement. An accelerometer 100 disposed in the camera housing and configured as a gyroscope detects movement and rotation of camera 40 as described above. As an end user moves camera 40 at display 26 as indicated by arrows 84, a controller 74 in camera 40 tracks the accelerations and rotations of camera 40 to detect movement. Mute logic 102 executing on controller 74 and interfaced with microphone 104 of camera 40 commands a mute of microphone 104 during movement of camera 40 to reduce the risk that unwanted noise related to the camera movement is communicated from the camera. A mute indicator 106 presented at display 26 provides the end user of feedback of the mute state when commanded. For example, camera 40 communicates the mute state to an embedded controller of an information handling system presenting camera visual information to change mute indicator from green to red during microphone mute. In one embodiment, camera 40 has a touch detection sensor included in the housing that can be used to command a mute before movement of the camera begins. In alternative embodiments, other indications of camera movement may be provided, such as movement detected by a touchscreen, Hall sensors, doppler, an infrared curtain and user presence detection sensors. In embodiments where the movement is detected exterior to the camera, mute logic 102 may execute on a processing resource of an information handling system, such as an embedded controller, by either manipulating information received from the camera or commanding the camera to mute. In one alternative embodiment, rather than muting all sounds captured by the camera, mute logic 102 may instead reduce the volume of captured audio or apply a filter that filters out sounds typically associated with camera movement.

Figure 11:
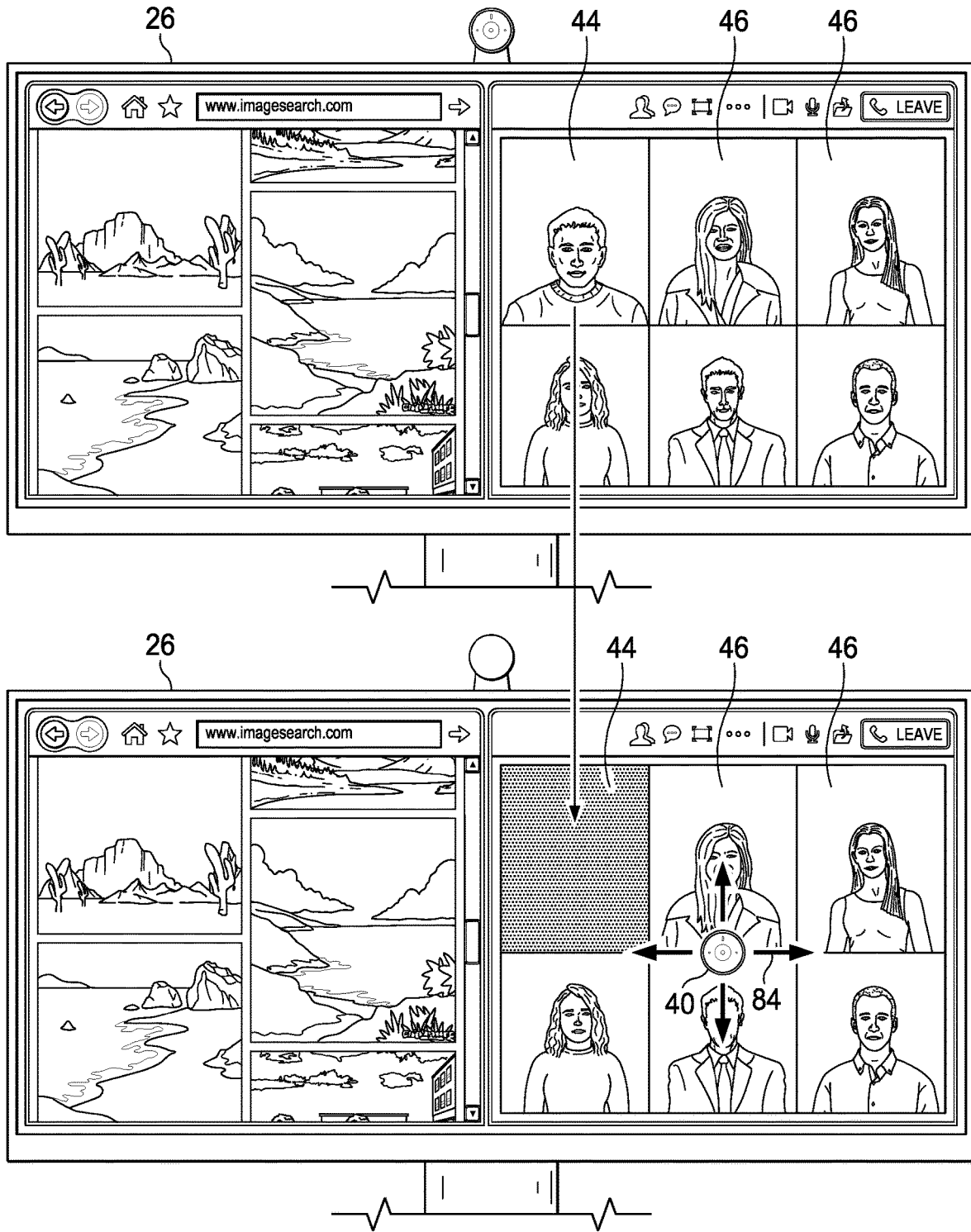
FIG. 11 depicts an example of a display presentation of a camera that darkens images associated with a camera presentation at movement of the camera.
Figure 12:
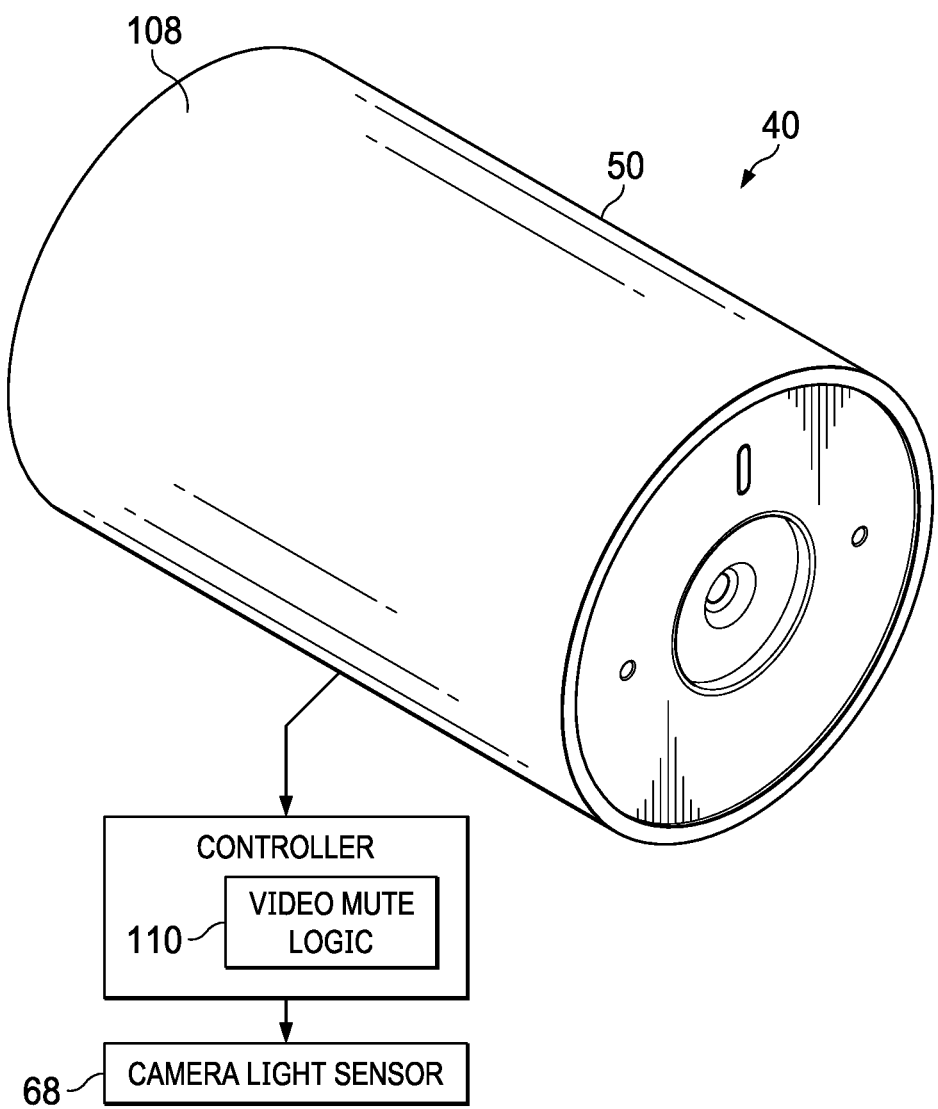
FIG. 12 depicts a block diagram of an example camera implementation having a video stream feed disabled during camera movement.

Referring now to FIGS. 11 and 12, a block diagram depicts an example camera implementation having a video stream feed disabled during camera movement. As with the audio mute described with respect to FIG. 10, movement of camera 40 may be detected by accelerations, a touch at the camera housing or external indications like movement detected at a display touchscreen. In the example embodiment, camera 40 has a camera housing 50 with an outer touch detection surface 108 that detects an end user grasp. A controller 74 inside of camera 40 executes a video mute logic 110 that pauses a camera video feed when touch detection surface 108 indicates an end user grasp associated with a movement of camera 40. In the example embodiment an end user shown in a camera image window 44 is shown as a dark image at detection of movement 84 while other video conference windows 46 continue to present videoconference content. In an alternative embodiment, an avatar of the end user may be presented during movement, or an image captured by the camera just prior to the movement. In one embodiment, outer touch surface 108 includes a touch detection surface that the camera front face that, when touched, selectively enables and disables capture of visual images with camera 40. For example, a tap at different predefined portions of outer touch sensor 108 may command different operations, such as camera image capture enable and disable, audio capture enable and disable, camera power on and off, video call start and finish and other operations. In one embodiment, the functions provided by touches at camera outer surface touch sensor 108 may be indicated by different color illuminations provide through housing 50 translucent material and light presented that the display, such as a green color on one side of the housing where touch turns on video capture and red color on an opposite side where touch turns of video capture. Other colors and accompanying display user interface instructions presented proximate the detected camera position may command other functions, such as audio mute. In another example embodiment, a camera light sensor 68, such as an ambient light sensor, commands functions when an end user covers the camera to darken the level of light.

Figure 13A:
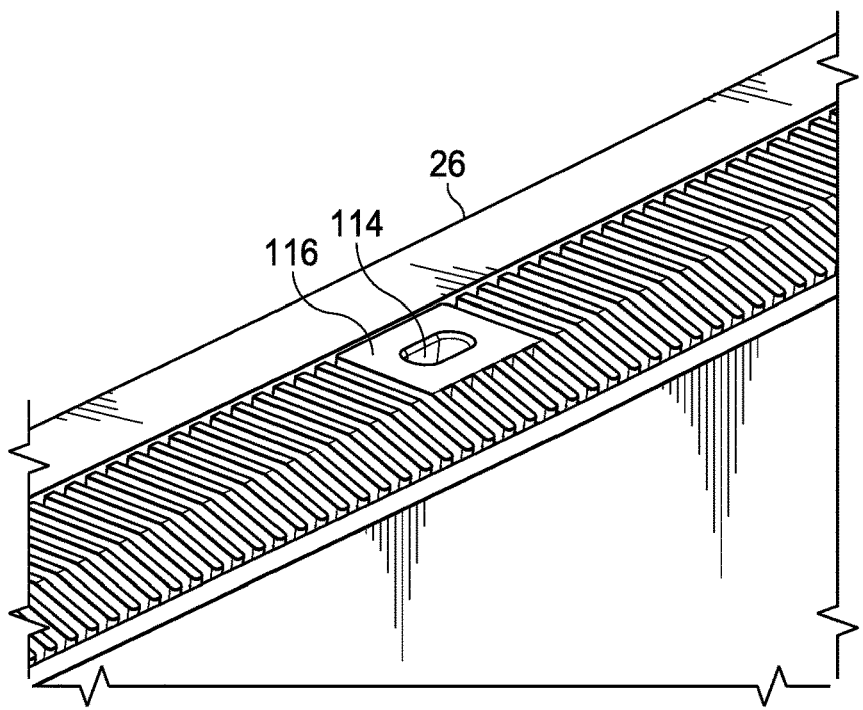
FIGS. 13A and 13B depict an upper perspective exploded view of a camera dock aligned to couple to a display upper side at a Type-C USB connector.
Figure 13B:
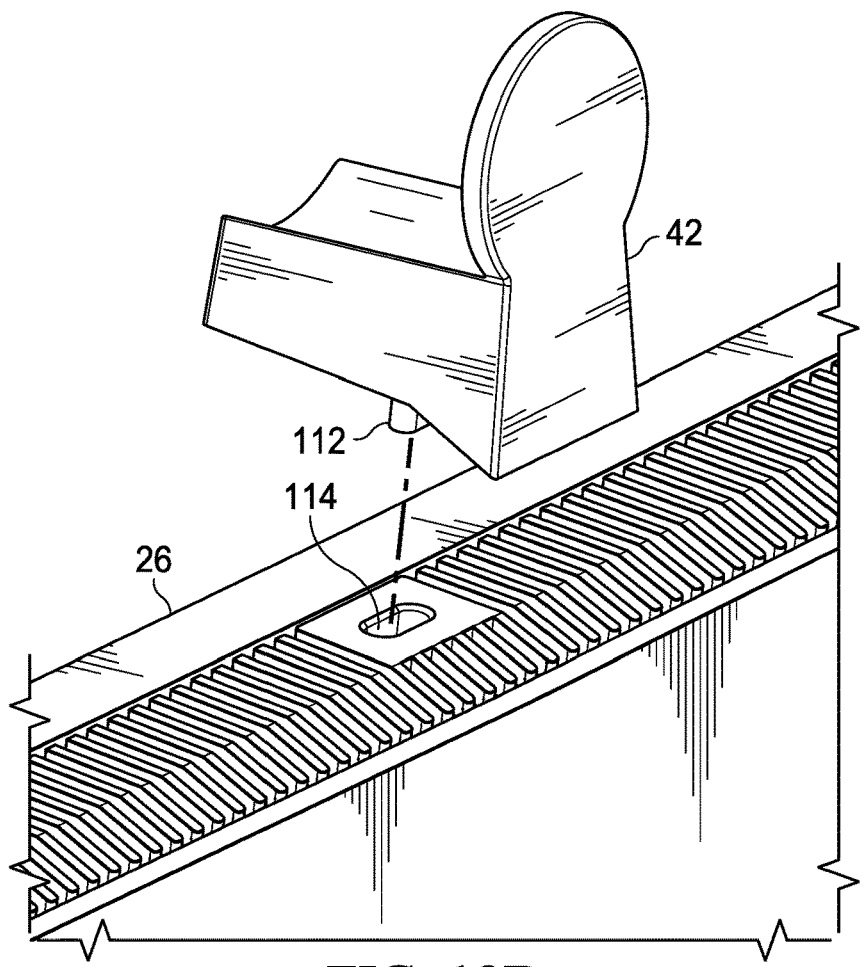

Referring now FIGS. 13 and 13A, an upper perspective exploded view depicts camera dock 42 aligned to couple to a display 26 upper side at a Type-C USB connector port 114. In the example embodiment, camera dock 42 has a lower surface configured to conform against an upper surface of display 26 and having a Type-C USB connector 112 that aligns with and fits into Type-C USB connector port 114 to couple camera dock 42 to display 26. FIG. 13A depicts a detailed view of reinforcement material 116 disposed around Type-C USB connector port 114 to provide reinforcement against forces that might be applied to camera dock 42. In addition to providing physical support to camera dock 42, the USB interface provides power and communication to camera dock 42 to manage wireless charging of the camera when in the dock. In one alternative embodiment, a short range wireless personal area network (WPAN) included in camera dock 42 may support communications with the camera when the camera rests in the camera dock, such as 60 GHz wireless interface, so that a docked camera can interface with an information handling system without WiFi. When camera dock 42 is not installed, the USB port is available to support cabled interfaces with other peripherals.

Figure 14A:
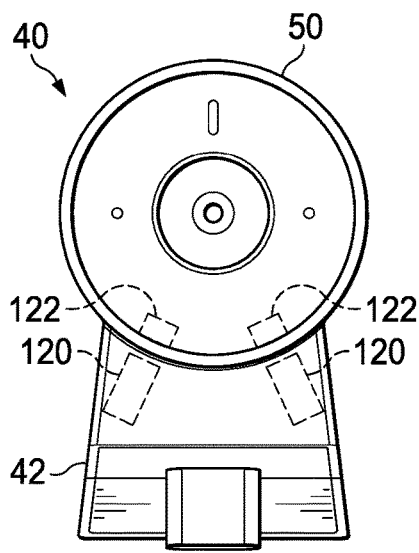
FIGS. 14A, 14B and 14C depict a system that aligns a camera in a camera dock to coordinate wireless charging of the camera.
Figure 14B:
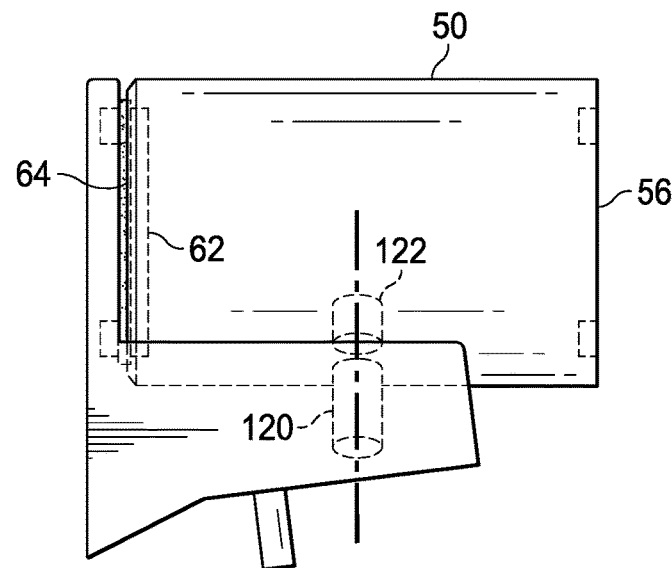
Figure 14C:
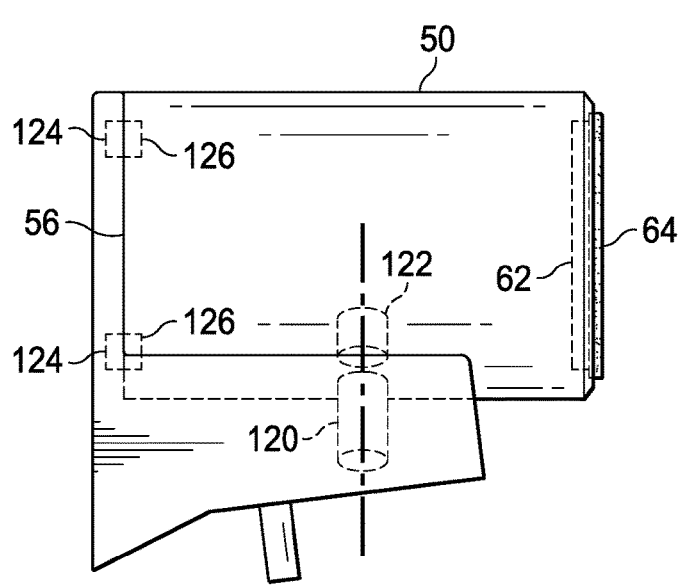

Referring now to FIGS. 14A, 14B and 14C, a system is depicted that aligns a camera in a camera dock to coordinate wireless charging of the camera. The example embodiment has different arrangements of magnets having opposing polarities that cooperate to align camera 40 in an upright position of camera dock 42. The particular arrangement of magnets used for a particular camera may depend upon the location of wireless charging for camera 40 from camera dock 42. In the example embodiment of FIG. 2B having wireless charging located in the center of camera 40, symmetrical arrangements of magnets of opposing polarity are included at opposing ends of camera 40 and camera dock 42 to ensure an upright orientation with alignment of wireless charging. As illustrated by FIG. 14B, when camera 40 rests on camera dock 42, magnet 62 has polarity so that interactions with magnets 124 work to rotate camera 40 in an upright position and to hold the rear side of housing 50 against the privacy rear wall of camera dock 42 to compress rear cushion surface 64. For example, magnet 62 has a north pole at an upper side of housing 50 and a south pole at the lower side of housing 50 to interact with an upper magnet 124 of camera dock 42 having a south pole and a lower magnet 124 of camera dock 42 having a north pole. When camera 40 is reversed in camera dock 42, magnets 126 at the front face of camera 40 having opposite polarities to magnets 124 align the camera to an upright position in the privacy orientation so that wireless charging aligns in a central lower location of camera 40 against a central upper location of camera dock 42. In an alternative embodiment that does not have a centrally located charger, a central set of opposing polarity magnets 120 and 122 are aligned in camera 40 and camera dock 42 symmetrically positioned to provide upright alignment whether camera 40 is place in a forward-facing or privacy position. As is depicted by FIG. 14A, in another alternative embodiment two magnets 120 are placed in camera dock 42 aligned with each of two magnets placed in camera 40 at an offset angle so that a central area has room to hold wireless chargers in alignment when camera 40 docks in camera dock 42.

Figure 15:
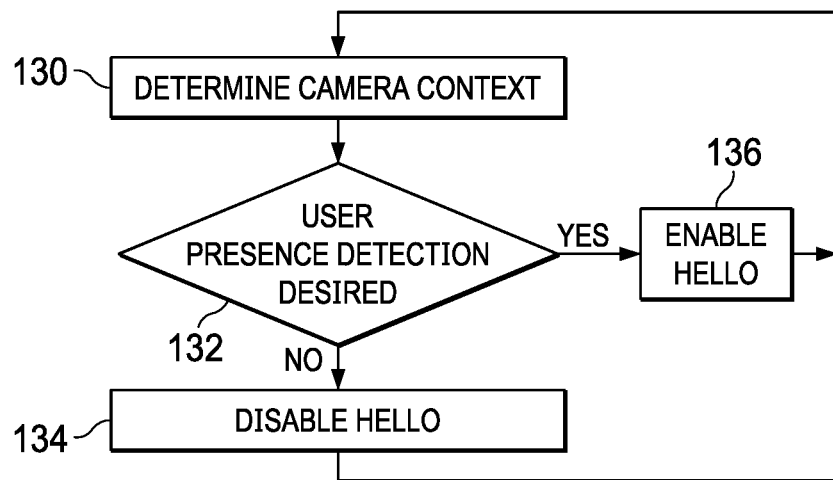
FIG. 15 depicts a flow diagram of a process for enabling user presence detection based upon camera context.

Referring now to FIG. 15, a flow diagram depicts a process for enabling user presence detection based upon camera context. For example, an infrared camera or user presence detection sensor included in camera 40 selectively illuminates a field of view with infrared light to determine in an end user is present and wakes an information handling system when the user is present, such as with the WINDOWS HELLO recognition. In some circumstances, an end user may desire personal security that disables the wake functionality, such as to prevent unauthorized or malicious users from hacking camera access to determine user presence. In the example embodiment, camera 40 has settings that define when user presence recognition is enabled based upon camera context, such as only when camera 40 is docked or magnetically attached to a display front face. In other situations, user presence detection is disabled to prevent unauthorized access and provide the end user with a definitive visual indication of when user presence is enabled. In an alternative embodiment, user presence detection may be set so that it only operates when the camera is on the display or in the dock. An end user may set the context for enabling and disabling user presence detection with a camera user interface.

The process starts at step 130 with a determination of camera context, such as whether the camera is docked, coupled to the display, in a privacy dock position or magnetically coupled to a stand. At step 132 a determination is made of whether to enable user presence detection based upon the sensed context, such as by comparing the sensed context against camera settings. If user presence detection is set to enable for the detected context, the process continues to step 136 to enable user presence detection and returns to step 130 to continue monitoring camera context. If at step 132 the context does not match a setting to enable user presence detection, the process continues to step 134 to disable user presence detection and returns to step 130. In one alternative embodiment, user presence detection context may include recency of an end user presence so that context analysis is adjusted based upon how an end user has interacted with an information handling system. For instance, if an end user has a camera placed on a stand and aligned to capture an image at a desktop, a wave in front of the camera may initiate user presence detection for a one minute period after a screen saver activates after which user presence detection is disabled. An end user may select such context based upon preferences.

Figure 16A:
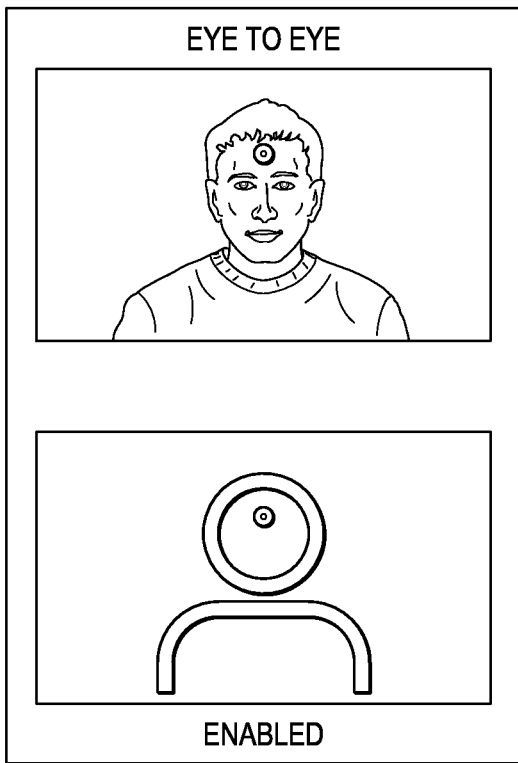
FIGS. 16A, 16B, 16C, 16D, and 16E depict examples of camera user experiences for different camera operational modes and contexts.
Figure 16B:
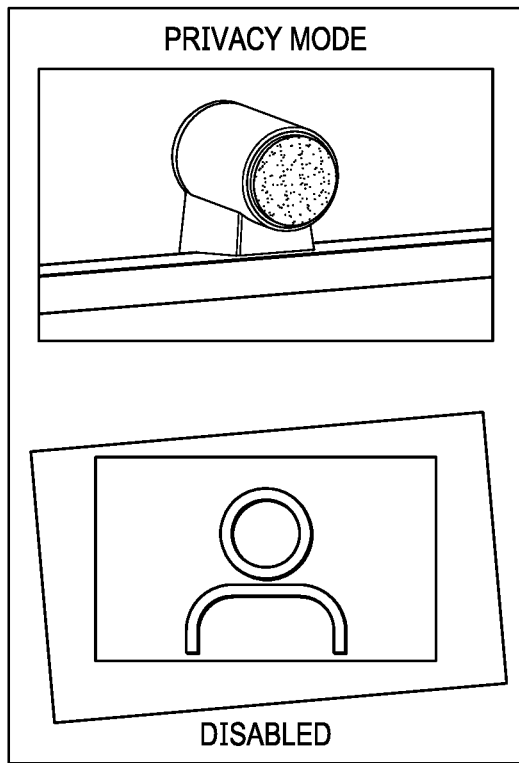
Figure 16E:
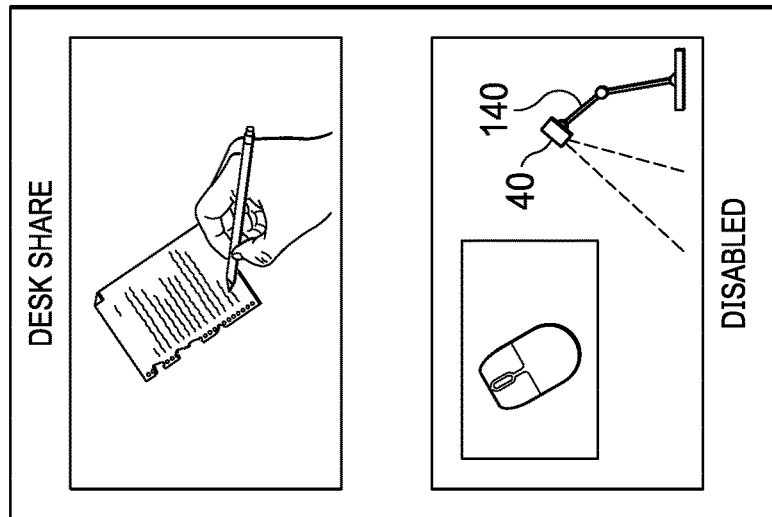
Figure 16D:
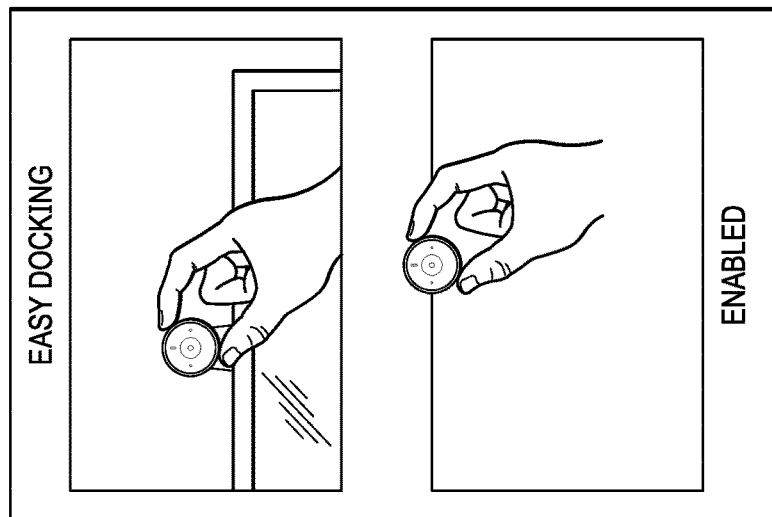
Figure 16C:
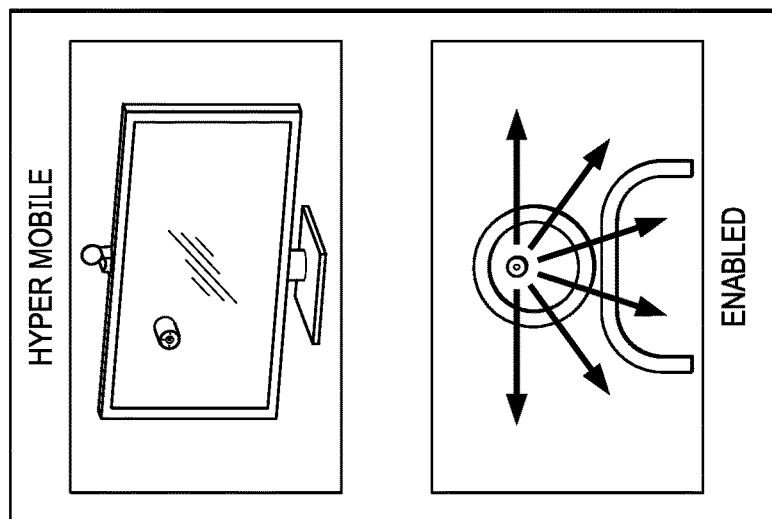

Referring now to FIGS. 16A, 16B, 16C, 16D, and 16E, examples of camera user experiences are depicted for different camera operational modes and contexts. FIG. 16A depicts camera 40 coupled to a peripheral display 26 with user presence detection enabled. FIG. 16B depicts camera 40 in a privacy mode have the lens aligned against the camera dock back support. In the privacy mode user presence detection is disabled both because the user presence detection lacks a field of view and because the camera turns off user presence detection. In an alternative embodiment having other user presence detection devices, such as doppler systems or a time of flight sensor in a portable information handling system that interfaces with display 26, the privacy mode may be detected by the information handling system to command privacy at some or all other camera and user presence detection devices associated with the display, such as devices integrated in a portable information handling system interfaced with the display. FIG. 16C depicts an example embodiment where an end user activity at a display adjusts the context for user presence detection enablement and disablement. When an end user has a high degree of activity at an information handling system user presence detection may remain enabled based upon the activity for a predetermined time even where camera context might otherwise disable user presence detection. FIG. 16D depicts an example of camera 40 placed in camera dock 42 with the field of view at the front of the display 26. Camera 40 detects the dock based upon the magnetic attraction and/or wireless charging to maintain the camera in an active viewing mode. An end user may also control the activity of camera 40 by touches at the camera housing. For example a touch in a first position can turn camera video capture on and off, while a touch in another position may turn user presence detection on an off. Touch inputs at camera 40 are supported by the touch input surface as described above. FIG. 16E depicts an embodiment having camera 40 magnetically coupled to a stand 140 that holds camera 40 over a viewing area of a desktop, such as for sharing documents in a videoconference. In a document sharing mode or when attached to stand 140, user presence detection is disabled. In an alternative embodiment, user presence detection may be enabled in some situations, such as for a short time period after a screen saver presentation at a display.

Figure 17:
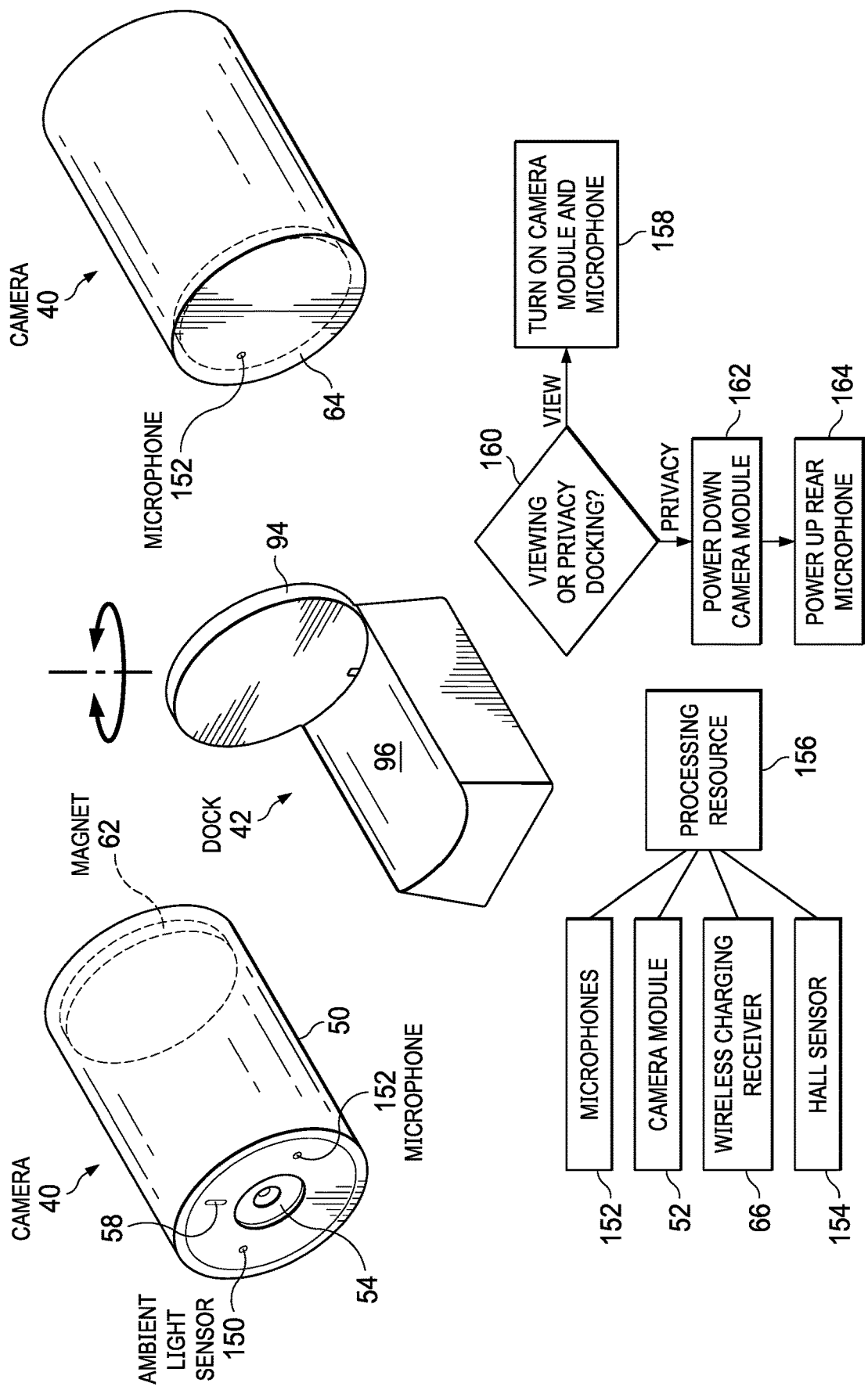
FIG. 17 depicts an example system and method for managing camera security with viewing and privacy docking configurations.

Referring now to FIG. 17, an example system and method are depicted for managing camera security with viewing and privacy docking configurations. In the example embodiment, camera 40 is depicted in a front-facing position having a field of view of camera lens 54 directed from camera dock 42 towards the front side of a display panel and in a rear-facing position having a rear cushion surface 64 facing outward by camera lens 54 is blocked by a privacy back support 94 extending up from the curved surface of cradle 96. Around the perimeter of camera lens 54, an orientation indicator 58, ambient light sensor 150 and microphone 152 are arranged. Ambient light sensor 150 detects ambient light, such as ambient light brightness, color and temperature for use in adjusting the image capture settings of the camera module. Microphone 152 captures audio sounds, such as to support an audiovisual image stream for camera 40. Magnet 62 holds camera 40 against privacy back support 94 when front facing and magnets near camera lens 54 holds camera 40 against privacy back support 94 when rear facing. A second microphone 152 exposed at rear cushion surface 64 is available to record audio when camera 40 is rear facing to secure against capture of visual images.

Security logic executing on a processing resource 156 of camera 40 coordinates operational status of microphones 152, camera module 52, wireless charging receiver 66 and a Hall sensor 154 to secure camera 40 based upon context, including a front or rear facing orientation of camera 40 in dock 42. As an initial matter, a touch detection surface of camera 40 allows an end user to select video, audio and privacy modes of operation for camera 40 based upon a touch at housing 50 and/or the front surface of camera 40 around the perimeter of camera lens 54. For example, a single or double tap around the perimeter of camera lens 54 commands a video capture pause while a second single tap commands video capture resumption. In an audio-only mode, microphone 152 may similarly be commanded between pause and resume of audio capture. Having a unique tap pattern to command pause and resume allows the security commands to be made across the entire body of camera 40 where a touch detection surface is available. Alternatively, specific touch areas may be defined for association with each command, such as an area of approximately the size of a finger for each desired function.

An example of the security logic is depicted as a flow diagram starting at step 160 where a determination is made of whether the camera is in a viewing or privacy mode. The privacy mode may be detected by blocking of light to the camera lens, by blocking of sound at the front microphone 152, by an orientation of the wireless charging receiver 66 relative to the wireless charger, by a Hall sensor that detects a magnet of dock 42 or other indications. The viewing mode may similarly be detected by light at camera module 52 and/or ambient light sensor 150 and orientation is dock 42 for charging or detection of a magnet by Hall sensor 154. At step 158 when the camera is in the viewing mode, the camera module and microphone are powered on. At step 162 when the camera is in the privacy mode, the camera module and microphone at the camera front are powered down to enhance security provided by blocking of the camera lens. At step 164, the rear microphone may selectively be powered up to provide capture of audio only information by camera 40. In one example embodiment, microphone 152 at the rear side of camera 40 is powered off when the front side microphone is powered on. In various embodiments, camera 40 may maintain a WiFi interface with an information handling system when in the privacy mode, such as by communicating a static image or audio while the camera module and microphone are powered down. Communicating static information maintains the WiFi connection so that camera 40 is able to rapidly recover from the privacy state to transmit a video stream without first having to reestablish the wireless communication interface.

Figure 18:
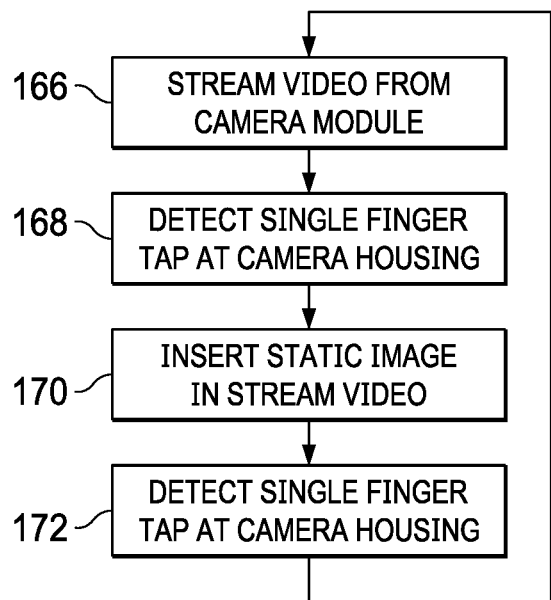
FIG. 18 depicts a flow diagram of a process for managing camera audio and video streams by a user tap at the camera housing.

Referring now to FIG. 18, a flow diagram depicts a process for managing camera audio and video streams by a user tap at the camera housing. The process starts at step 166 with a stream of video and/or audio from the camera module to an information handling system, such as through a wireless local area network interface. At step 168, a single tap is detected at the camera housing to indicate a transition to a privacy mode. In response, at step 170 a static image is inserted into the video stream, such as store pictured of an end user captured in the video stream or a black image that shows a blank content. The static image maintains a wireless interface with the camera and information handling system so that a rapid recovery to transmit the video stream is provided when commanded. At step 172, detection of another single finger tap at the camera housing command a resumption of the video stream at step 166.

Figure 19:
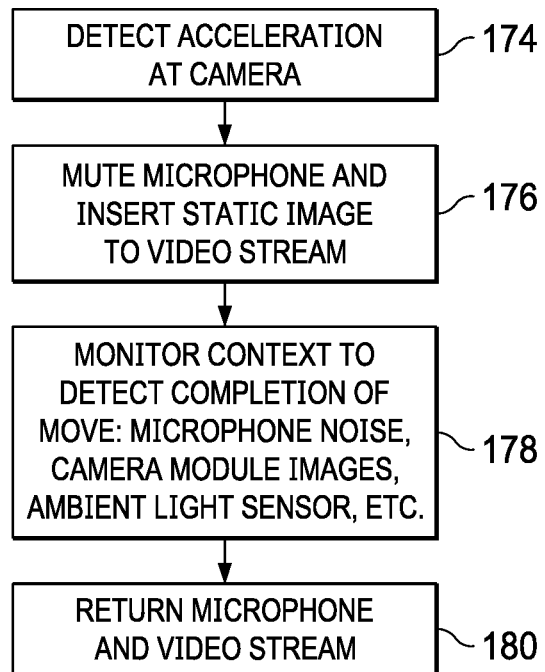
FIG. 19 depicts a flow diagram of a process for managing audio and video pauses during movement of a camera.

Referring now to FIG. 19, a flow diagram depicts a process for managing audio and video pauses during movement of a camera. When an end user moves camera 40 to different positions of a display panel, interactions of end user grasps working against magnetic attraction can result in jumpy movement patterns and disruptive sounds that may be communicated through the camera video stream to other video conference participants. To minimize the impact of such movements, the camera monitors for indications of movement and responds to such indications by pausing audio and/or video of the camera as appropriate. An indication of movement of a camera may come from a touch at the camera housing, a blocking of camera module or ambient light sensor light by a hand grasp, detection of accelerations at the camera, detection of an end user breach of an infrared curtain in front of the display, and/or detection of movement of the camera at a touch detection surface of the display panel. In the example embodiment, at step 174 detection of an acceleration of the camera by an accelerometer within the camera provides an indication of movement. In alternative embodiments where movement is detected external to the camera, such as with a display panel touch screen, the detection of movement may be communicated to the camera or the muting of video and audio may be performed external to the camera, such as with code on an information handling system or display controller. At step 176 the microphone is muted and a static image is inserted into the video stream based upon detection of the camera movement. As describe above, a preset static video or sound track may be communicated from the camera to keep the wireless interface prepared for rapid transition to active audiovisual stream information. In another alternative embodiment, a filter may be applied to the audio captured by the microphone that quiets the sound and filters out sounds typical with camera movement. At step 178, context is monitored to detect a completion of the camera movement, such as an end to detect accelerations. In one embodiment, the camera microphone audio and camera module video stream may be monitored internally at the camera even though not communicated outside of the camera so that completion of movement is detected by the audiovisual information. Once motion completion is detected, the process continues to step 180 to resume the microphone and video stream communication from the camera.

Figure 20B:
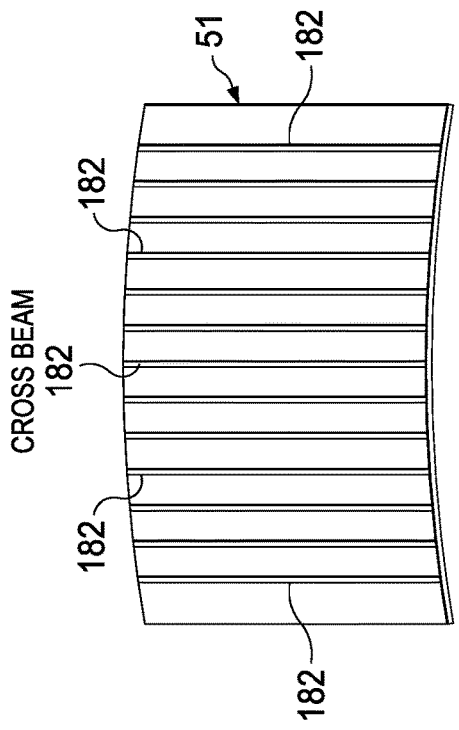
FIGS. 20A, 20B, 20C and 20D depict examples of display backplates having adjacent crossbeams sized to provide uniform magnetic attraction to a camera of a defined dimension.
Figure 20D:
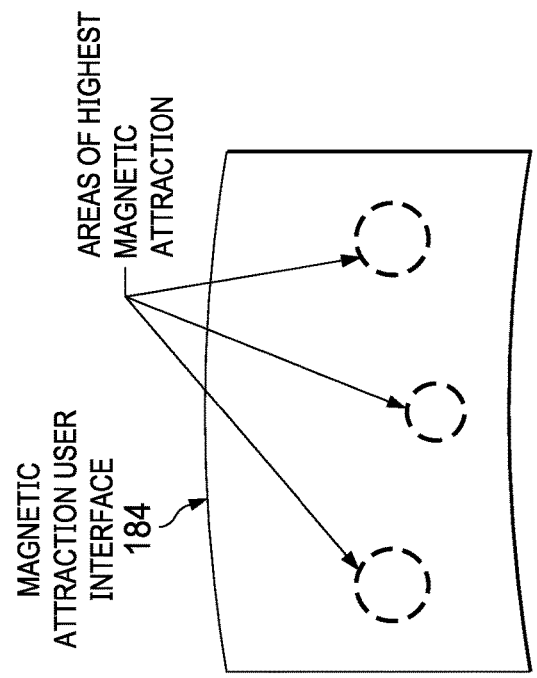
Figure 20A:
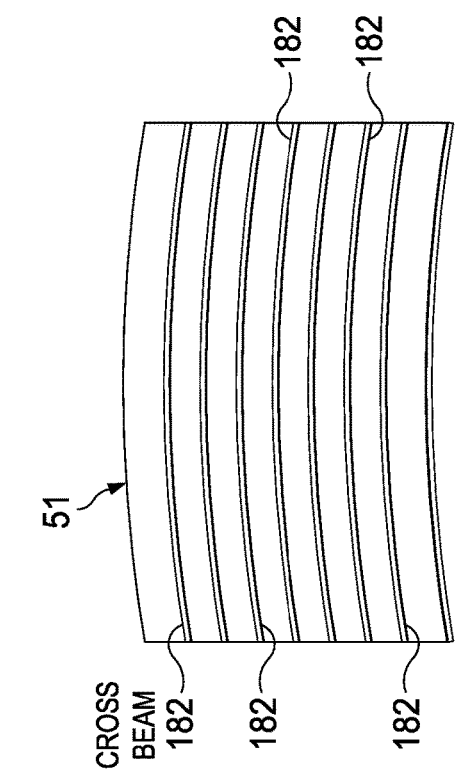
Figure 20C:
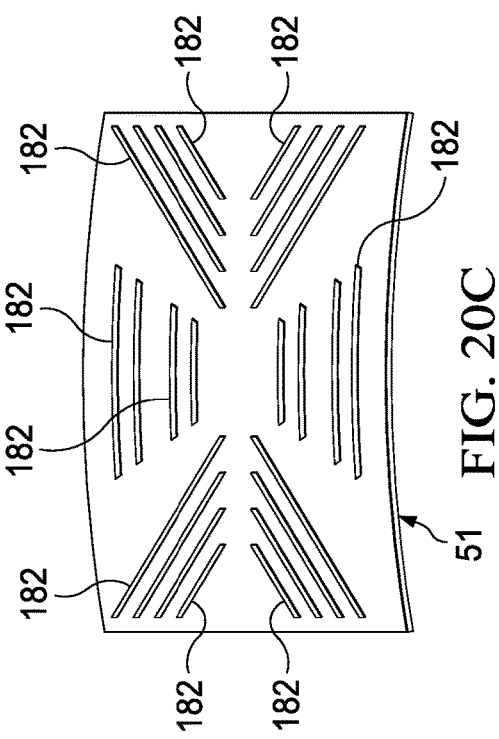

Referring now to FIGS. 20A, 20B, 20C and 20D, examples depict display backplates 51 having adjacent crossbeams 182 sized to provide uniform magnetic attraction to a camera of a defined dimension. As was described above with respect to FIGS. 3 and 4, the formation of ridges in backplate 51 enhances the structural strength of the backplate, allowing for a thinner and lighter ferromagnetic metal material than in a flat surface. In order to provide a uniform magnetic attraction of the camera across recessed areas of the ridge construction where the distance between the magnet and ferromagnetic material is increased, the size across the recessed areas is established to correspond with the size of the magnet and camera housing, such as the diameter of the camera cylindrical housing. For instance, when the full sine function of the ridge construction is the diameter of the cylindrical housing, the magnetic attraction remains uniform for the camera at different positions of the sine function. FIG. 20A depicts an example embodiment having plural adjacent horizontal crossbeams 182 with the recessed areas formed to support an even distribution of magnetic attraction across the display panel. FIG. 20B depicts plural adjacent vertical crossbeams 182 that also provides a uniform magnetic attraction but has the beam construction in a vertical direction. FIG. 20C depicts a backplate 51 construction having a mixture of vertical and horizontal crossbeams 182. In various embodiments, the crossbeams may extend an entire length or width of the backplate or only a portion of the length or width. FIG. 20D depicts an example of a magnetic attraction user interface 184 that presents at the display panel to highlight for an end user the best locations for magnetic attraction of the camera. In one alternative embodiment, these areas of preferred or enhanced magnetic attraction may be provided by adding ferromagnetic material in a recessed area of a cross beam at a closer distance from the display panel.

In alternative embodiments, alternative types of user interfaces may be presented at the display panel that cooperate with the camera housing light guide material to enhance an end user experience. For instance, as is described above., the camera housing is manufactured from a light guide material, such as a cast or extruded acrylic, that provides a path for light illuminated at the display to pass through the housing for presentation at the front of the camera. In one example embodiment, the display presents green color behind the camera when the camera is active and capturing visual images so that the camera housing appears green; yellow behind the camera when the camera is paused so that the camera appears yellow, and red behind the camera when the camera is stopped or off so that the camera appears off. Green, yellow and red colors may alternatively indicate battery charge, such as with a percent of battery remaining shown by an amount of the cylindrical housing that is illuminated. The battery status may be further emphasized by presenting the ring on the display around the circumference of the display housing or flashing up a small user interface box near the position of the camera on the display without disrupting other display content.

Figure 21:
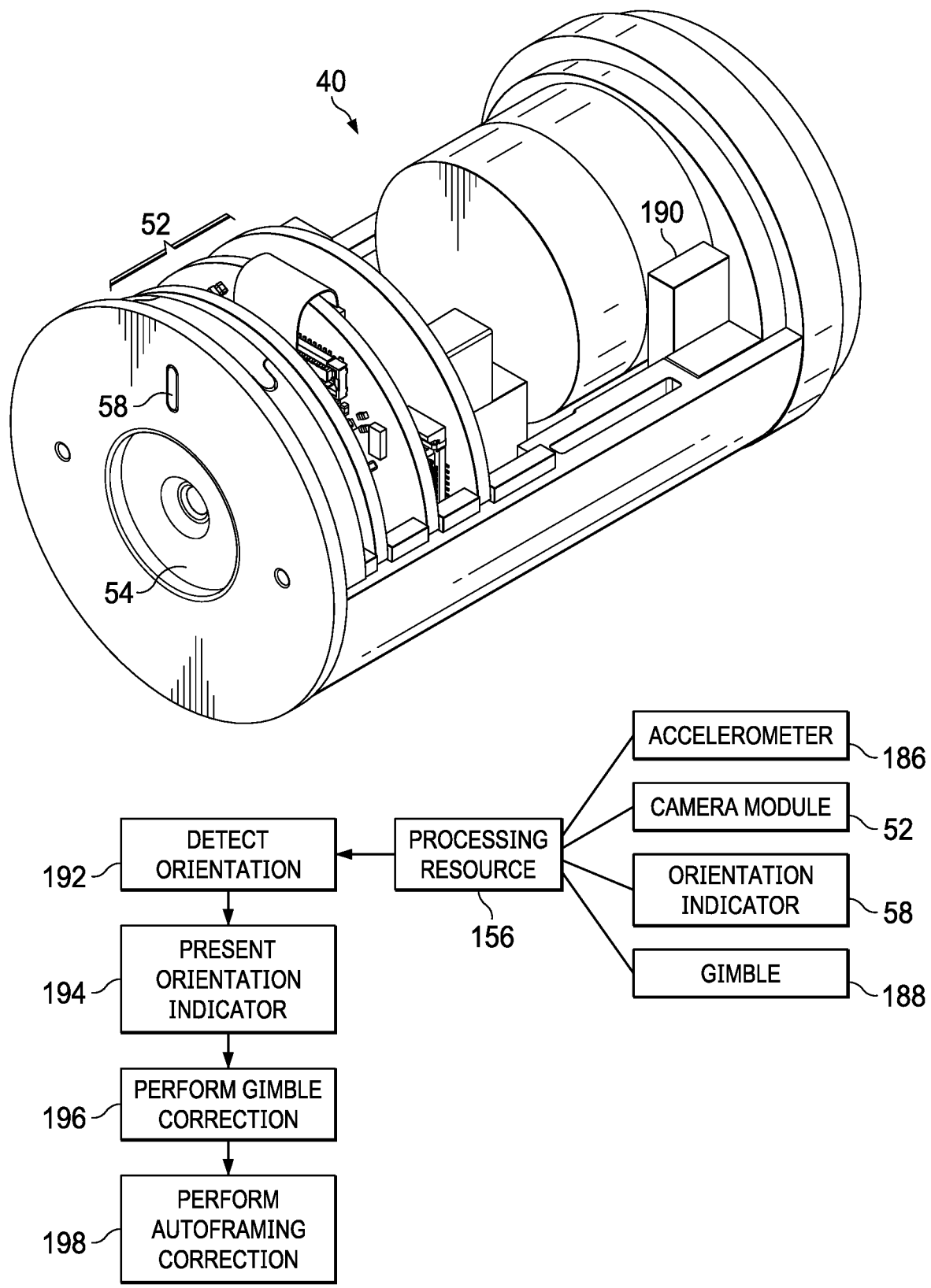
FIG. 21 depicts an example system and method for managing camera module orientation when magnetically attracted to a display panel.

Referring now to FIG. 21, an example system and method are depicted for managing camera module orientation when magnetically attracted to a display panel. As is described above, the cylindrical housing provides a convenient small form factor, however the circular shape does not provide a reference for an upright vertical orientation of camera module 52. Although autoframing may be used to digitally correct an offset orientation, it introduces a delay in video processing and detracts from image resolution. In the example embodiment, in addition to providing an orientation indicator 58 that provides a visual indication of an upright vertical orientation, a gimble actuator 190 is provided to internally rotate camera module 52 relative to housing 50 of camera 40. The example depicts a rack and pinion arrangement of gimble actuator 190, that provides a precision correction of camera module 52 vertical alignment, such as less than five degrees, after the end user achieves a rough alignment with alignment indicator 58. In an alternative embodiment, gimble actuator 190 may rotate camera module 52 a full 360 degrees within the camera housing.

To manage camera orientation, a processing resource 156 tracks accelerations with an accelerometer 186 to determine an orientation relative to gravity, tracks visual images captured by camera module 52 to determine an offset from an upright vertical orientation by analysis of the visual image, presents the relative orientation with the orientation indicator 58 and commands rotation of gimble 188. The orientation logic starts at step 192 by detecting the orientation and continues to step 194 to present the orientation at the orientation indicator 194, such as with different colors to indicate the amount of offset from upright vertical orientation. At step 196, once the orientation is within a defined accuracy, a gimble correction is performed to help obtain a more precise upright vertical orientation, such as by establishing a exact upright vertical orientation by reference to the accelerometer or by analysis of the visual image captured by the camera. At step 198, autoframing to digitally correct alignment offset may be performed as needed to obtain an upright vertical image. As is described above, vertical alignment may allow for 90, 180 and 270 degrees of alignment offset at which autoframing correction will have minimal processing and introduce minimal distortion.

Although the present invention has been described in detail, it should be understood that various changes, substitutions and alterations can be made hereto without departing from the spirit and scope of the invention as defined by the appended claims.

What is claimed is:

1. An information handling system comprising:
    a processor operable to execute instructions to process information;
    a memory interfaced with the processor and operable to store the instructions and information;
    a display interfaced with the processor and operable to present the information as visual images at a display panel, the display panel having a ferromagnetic material disposed at a rear side of the display panel;
    a camera having a processing resource, a non-transitory memory, a camera module operable to capture visual images and a magnet disposed in a housing, the magnet attracted to the ferromagnetic material to hold the camera at the display panel with the camera module aligned to capture a field of view at a front position of the display;
    a microphone disposed in the camera and operable to detect audio sounds;
    a sensor operable to detect movement of the camera; and
    instructions stored in the non-transitory memory that when executed on the processing resource mute the microphone when the sensor senses camera movement;
    wherein the instructions mute the microphone and turn off the video stream by continuing to collect the microphone audio and the camera module video at the camera and by not communicating the microphone audio and camera module video stream to the information handling system during the sensed movement, the instructions monitoring the microphone audio to determine when movement is complete.

2. The information handling system of claim 1 further comprising:
    a touch detection surface at the display panel operable to detect the camera position on the display panel;
    wherein the sensor comprises a camera manager executing on the processor and comparing the camera position on the display panel to detect the camera movement.

3. The information handling system of claim 1 wherein the sensor comprises an accelerometer disposed in the camera.

4. The information handling system of claim 1 wherein the sensor comprises a touch detection surface at the camera housing operable to detect a touch associated with camera movement.

5. The information handling system of claim 1 wherein the sensor comprises a light sensor operable to detect an end user grasp of the camera associated with camera movement.

6. The information handling system of claim 1 wherein the camera mutes the microphone locally at the camera in response to movement detected at the camera.

7. The information handling system of claim 6 wherein the instructions mute the microphone by filtering sounds associated with movement of the camera by sliding across the display.

8. The information handling system of claim 1 wherein the instructions further turn off a video stream of the camera module in response to the movement.

9. A method for coupling a camera to a display, the method comprising:
    coupling a camera to a display panel front face with a magnet disposed in the camera attracted to a ferromagnetic material behind the display panel;
    detecting movement of the camera relative to the display panel front face;
    in response to the detecting movement of the camera, muting audio captured by a microphone included in the camera; and
    monitoring audio during the muting to determine when the movement is completed to unmute the audio.

10. The method of claim 9 further comprising:
    muting the camera by turning off communication of audio from the camera while monitoring the audio at the camera; and
    analyzing the audio at the camera to determine that movement has stopped and in response to communicate the audio from the camera.

11. The method of claim 10 further comprising:
    in response to the detecting movement of the camera, turning off communication of a video stream captured by the camera; and
    in response to the analyzing at the camera to determine that movement has stopped, communicating the video stream from the camera.

12. The method of claim 9 wherein the detecting movement further comprises detecting accelerations of the camera at the display with an accelerometer.

13. The method of claim 9 wherein the detecting movement further comprises detecting touches at a touch sensor of the camera housing, the touches associated with movement by an end user grasp.

14. The method of claim 9 wherein the muting further comprises:
    filtering the audio captured by the microphone to isolate voice; and
    communicating only the audio of isolated voice during the movement.

15. The method of claim 9 further comprising inserting a stored sound for communication from the camera, the stored sound indicating mute of audio during movement of the camera.

16. The method of claim 9 wherein the detecting movement further comprises sensing blocking of light at the camera associated with a hand grasp at the camera.

17. A camera comprising:
    a cylindrical housing;
    a camera module disposed at one end of the cylindrical housing and aligned to capture visual images from a field of view;
    a microphone disposed in the cylindrical housing and operable to capture audible sounds;
    a magnet disposed in an opposite end of the cylindrical housing and configured to couple to a display panel backplate to hold the cylindrical housing at the display panel front side with the field of view directed away from the display panel;

a sensor disposed in the cylindrical housing and operable to detect movement of the cylindrical housing;

a processing resource disposed in the camera and operable to execute instructions, the processing resource interfaced with the microphone and sensor; and non-transitory memory storing instructions that when executed on the processing resource command the microphone to mute in response to movement of the cylindrical housing detected by the sensor, the instructions monitoring the microphone audio to determine when movement is complete to unmute the audio.

18. The camera of claim 17 wherein the sensor comprises an accelerometer and the instructions mute the microphone in response to a predetermined acceleration detected by the accelerometer.

19. The camera of claim 18 wherein the instructions further disable capture of visual images by the camera module in response to the detecting of movement.

\* \* \* \* \*